US 9,424,190 B2

(12) United States Patent
Tran

(10) Patent No.: US 9,424,190 B2
(45) Date of Patent: Aug. 23, 2016

(54) DATA PROCESSING SYSTEM OPERABLE IN SINGLE AND MULTI-THREAD MODES AND HAVING MULTIPLE CACHES AND METHOD OF OPERATION

(75) Inventor: Thang M. Tran, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 659 days.

(21) Appl. No.: 13/213,387

(22) Filed: Aug. 19, 2011

(65) Prior Publication Data

US 2013/0046936 A1 Feb. 21, 2013

(51) Int. Cl.
*G06F 12/08* (2016.01)
*G06F 9/30* (2006.01)
*G06F 9/38* (2006.01)

(52) U.S. Cl.
CPC ........ *G06F 12/0813* (2013.01); *G06F 9/30047* (2013.01); *G06F 9/30189* (2013.01); *G06F 9/3824* (2013.01); *G06F 9/3851* (2013.01); *G06F 9/3891* (2013.01)

(58) Field of Classification Search
CPC G06F 9/3987; G06F 9/30043; G06F 9/30123
See application file for complete search history.

(56) References Cited

U.S. PATENT DOCUMENTS

| 2003/0005266 A1* | 1/2003 | Akkary et al. ................ 712/220 |
| 2006/0106923 A1* | 5/2006 | Balasubramonian et al. ............................. 709/223 |
| 2007/0204137 A1* | 8/2007 | Tran .............................. 712/214 |
| 2008/0028150 A1* | 1/2008 | Toussi ........................... 711/122 |
| 2008/0091880 A1* | 4/2008 | Vishin ........................... 711/122 |
| 2010/0146209 A1* | 6/2010 | Burger et al. ................. 711/120 |

OTHER PUBLICATIONS

U.S. Appl. No. 13/037,013, filed Feb. 28, 2011.
U.S. Appl. No. 13/036,321, filed Feb. 28, 2011.

* cited by examiner

*Primary Examiner* — Gary W Cygiel

(57) ABSTRACT

Systems and methods are disclosed for a computer system that includes a first load/store execution unit 210a, a first Level 1 L1 data cache unit 216a coupled to the first load/store execution unit, a second load/store execution unit 210b, and a second L1 data cache unit 216b coupled to the second load/store execution unit. Some instructions are directed to the first load/store execution unit and other instructions are directed to the second load/store execution unit when executing a single thread of instructions.

20 Claims, 10 Drawing Sheets

DATA PROCESSING SYSTEM OPERABLE IN SINGLE AND MULTI-THREAD MODES AND HAVING MULTIPLE CACHES AND METHOD OF OPERATION

BACKGROUND

1. Field

This disclosure relates generally to data processing systems, and more specifically, to data processing systems operable in single and multi-thread modes and having multiple caches.

2. Related Art

Various processor designers have attempted to increase on-chip parallelism through superscalar techniques, which are directed to increasing instruction level parallelism (ILP), and multi-threading techniques, which are directed to exploiting thread level parallelism (TLP). A superscalar architecture attempts to simultaneously execute more than one instruction by fetching multiple instructions and simultaneously dispatching them to multiple (sometimes identical) functional units of the processor. A typical multi-threading operating system (OS) allows multiple processes and threads of the processes to utilize a processor one at a time, usually providing exclusive ownership of the processor to a particular thread for a time slice. In many cases, a process executing on a processor may stall for a number of cycles while waiting for some external resource (for example, a load from a random access memory (RAM)), thus lowering efficiency of the processor. Simultaneous multi-threading (SMT) allows multiple threads to execute different instructions from different processes in the same processor, using functional units that another executing thread or threads left unused.

In order to improve memory performance of processing systems, complex memory structures which seek to exploit the individual advantages of different types of memory have been developed. In particular, it has become common to use fast cache memory in association with larger, slower and cheaper main memory. For example, the memory in a computer system can be organized in a memory hierarchy comprising memory of typically different size and speed. Thus a computer system may typically comprise a large, low cost but slow main memory and in addition have one or more cache memory levels comprising relatively small and expensive but fast memory. During operation data from the main memory is dynamically copied into the cache memory to allow fast read cycles. Similarly, data may be written to the cache memory rather than the main memory thereby allowing for fast write cycles.

A memory operation where the processor can receive the data from the cache memory is typically referred to as a cache hit and a memory operation where the processor cannot receive the data from the cache memory is typically referred to as a cache miss. Typically, a cache miss does not only result in the processor retrieving data from the main memory but also results in a number of data transfers between the main memory and the cache. For example, if a given address is accessed resulting in a cache miss, the subsequent memory locations may be transferred to the cache memory. As processors frequently access consecutive memory locations, the probability of the cache memory comprising the desired data thereby typically increases.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein are capable of operating in single and multi-threaded modes. In multi-thread mode, multiple independent load/store execution units and multiple independent data caches are used to help enable the threads to be executed at least as fast as they would execute on separate processors. Each independent load/store execution unit is used to execute load and store instructions of a corresponding thread and is coupled to provide load and store accesses of that corresponding thread to a corresponding one of the independent data caches. In single-thread mode, each of the multiple independent data caches continue to operate independently. However, load and store accesses of the executing single thread are steered to the appropriate load/store execution unit and corresponding data cache. Therefore, in single thread mode, all of the multiple independent data caches may be utilized. This may allow for improved single-thread performance as compared to systems in which only the independent data cache corresponding to the load/store execution unit of the executing single thread is utilized.

Figure 1:
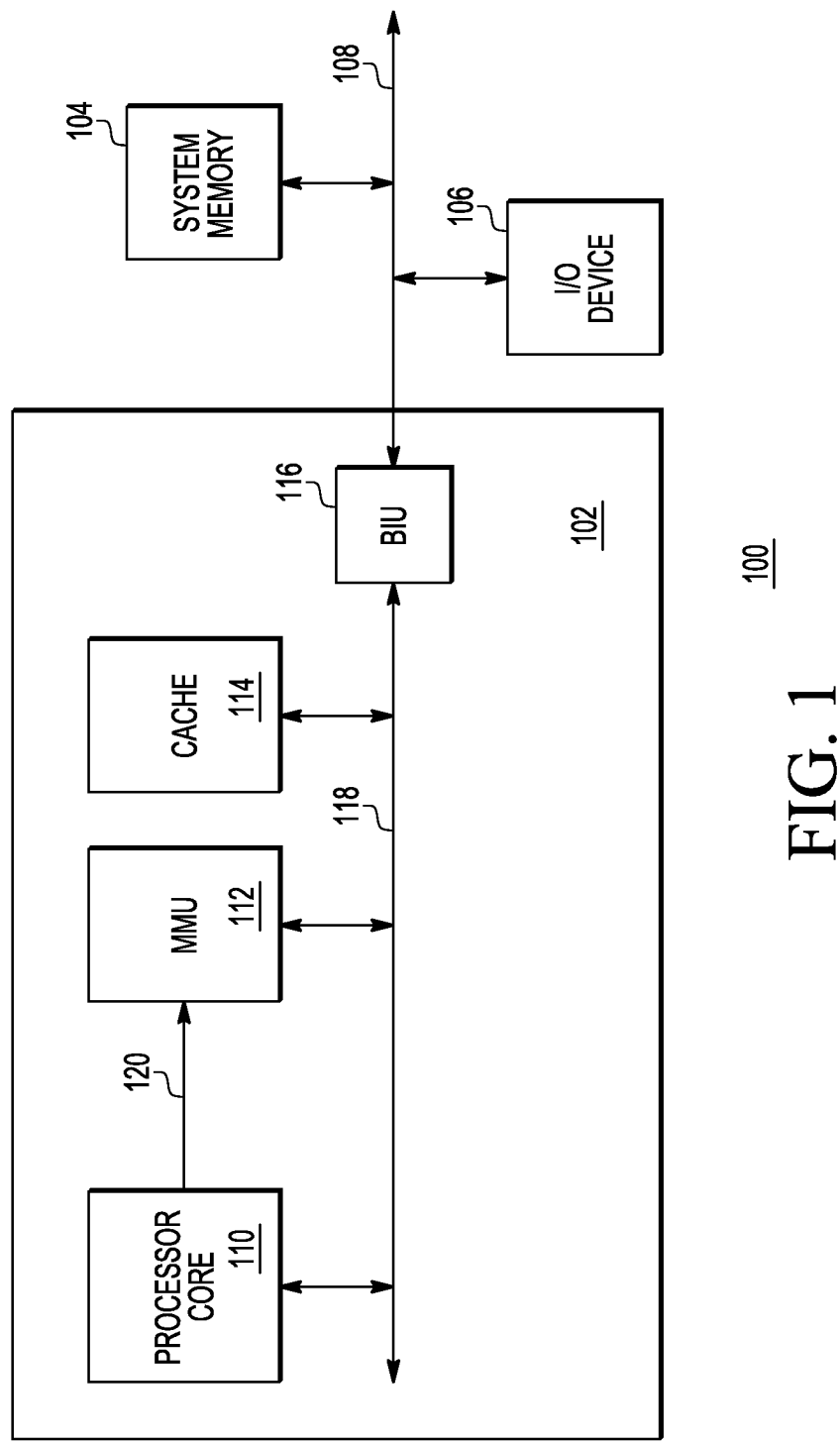
FIG. 1 illustrates, in block diagram form, a data processing system in accordance with one embodiment of the present disclosure.

FIG. 1 illustrates a data processing system 100 that can be configured to utilize multiple independent data caches during single-thread mode. In the depicted example, data processing system 100 includes processing device 102 (which may also be referred to as a processor or microprocessing system), system memory device 104 (e.g., random access memory (RAM)), and one or more input/output devices 106 connected via bus 108. Bus 108 may be implemented as any type of system interconnect, such as, for example, a fabric switch. Processing device 102 includes processor core 110, memory management unit (MMU) 112, cache memory 114, and bus interface unit (BIU) 116 interconnected via bus 118, whereby BIU 116 serves as an interface between bus 118 and bus 108.

In operation, processing device 102 executes instructions using processor core 110, whereby instruction data and operand data can be accessed from cache 114, system memory device 104, I/O device 106, or another source. Data resulting from the execution of the instructions can be provided for storage in system memory device 104 or provided to I/O device 106 via BIU 116. In order to expedite memory accesses to devices external to processing device 102 (e.g., system memory device 104 and I/O device 106), cache 114 can be used to cache instruction data and related data. Cache 114 may include any number and type of caches. For example, cache 114 may include level 1 (L1) data caches which are accessed first and may also include higher level data caches (such as level 2 (L2) caches). Additionally, cache 114 may include one or more instruction caches in addition to data caches.

MMU 112 controls accesses to cache 114 and memory accesses to devices external to processing device 102, including system memory device 104 and I/O device 106. MMU 112 can map the system memory device 104 and the bus interface of the I/O device 106 to corresponding memory addresses (e.g., virtual memory addresses) so that all accesses to the external devices are treated as a memory access. MMU 112 may include translation look aside buffers (TLBs) which translates between virtual addresses received by MMU 112 to physical addresses which are provided to cache 114 or BIU 116 for the memory access.

Figure 2:
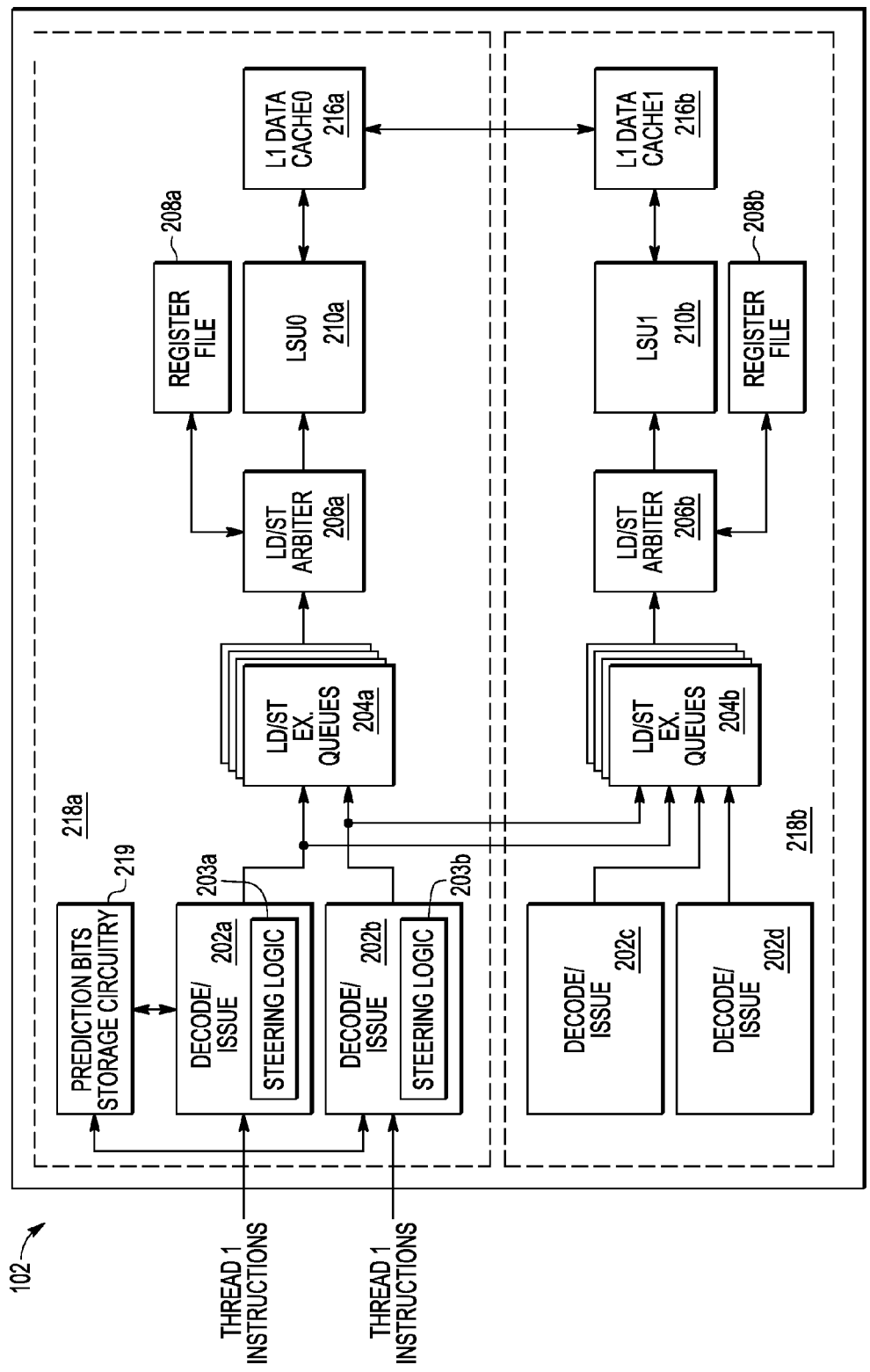
FIG. 2 illustrates, in block diagram form, a portion of a data processor of FIG. 1 in accordance with one embodiment of the present disclosure.

FIG. 2 is a diagram of an embodiment of components that can be used in processor 102 of FIG. 1 configured to run in single thread mode include decode/issue units 202a, 202b, 202c, load/store execution (ld/st ex) queues 204a, 204b, load/store (ld/st) arbiters 206a, 206b, register files 208a, 208b, load/store execution units (LSU0 and LSU1) 210a, 210b, and level 1 data cache units (L1 data cache 0 and L1 data cache 1) 216a, 216b. Decode/issue unit 202a includes steering logic 203a and decode/issue unit 202b includes steering logic 203b. Elements referred to herein with a particular reference number followed by a letter are collectively referred to by the reference number alone. For example, decode units 202a-202d are collectively referred to as decode units 202. Note that ld/st execution units 210a and 210b may be referred to as LSU0 and LSU1, respectively.

Processor 102 includes two execution pipelines 218a, 218b. Pipeline 218a includes decode/issue units 202a, 202b, prediction bits storage circuitry 219, ld/st ex queues 204a, ld/st arbiter 206a, register file 208a, LSU0 210a, and L1 data cache 0 216a. Pipeline 218b includes decode/issue units 202c, 202d, ld/st ex queues 204b, ld/st arbiter 206b, register file 208b, LSU1 210b, and L1 data cache 1 216b. Processor 102 is capable of operating in single thread or multi-thread mode.

In multi-thread mode, each ld/st ex unit and corresponding L1 data cache operate independently from the other ld/st ex unit and L1 data cache. For example, in dual thread mode, a first thread may utilize decode/issue units 202a and 202b, ld/st execution queues 204a, ld/st arbiter 206a, register file 208a, LSU0 210a, and L1 data cache 0 216a, and a second thread may utilize decode/issue units 202c and 202d, ld/st execution queues 204b, ld/st arbiter 206b, register file 208b, LSU1 210b, and L1 data cache 1 216b. Therefore, in dual thread mode, decode/issue units 202a and 202b provide instructions to ld/st ex queues 204a, and Ld/st arbiter 206a selects ld/st instructions from queues 204a to provide to LSU0 210a, accessing register file 208a as needed. LSU0 210a provides ld/st accesses to L1 data cache0 216a. Decode/issue units 202c and 202d provide instructions to ld/st ex queues 204b, and Ld/st arbiter 206b selects ld/st instructions from queue 204b to provide to LSU1 210b, accessing register file 208b as needed. LSU1 210b provides ld/st accesses to L1 data cache0 218b. Therefore, in one example, pipeline 218a may be used for executing a first set of one or more threads and pipeline 218b may be used for executing a second set of one or more threads. In some embodiments, components can be divided equally between the first and second threads. Other components (not shown) such as a floating point unit, an integer complex execution unit, and/or one or more integer execution units, for example, can be shared between the two pipelines 218. Also, system 102 can be configured to execute more than two threads, such as in quad thread mode, in which four threads may be executed.

In single thread configuration, decode/issue units 202a and 202b provide ld/st instructions to ld/st ex queues 204a and 204b. Ld/st arbiter 206a selects ld/st instructions from queues 204a to provide to LSU0 210a, accessing register file 208a as needed. LSU0 210a provides ld/st accesses to L1 data cache0 216a. Ld/st arbiter 206b selects ld/st instruction from queues 204b to provide to LSU1 210b, accessing register file 208b as needed. LSU1 210b provides ld/st accesses to L1 data cache1 216b. An instruction unit (not shown) implements instruction queues that may provide one program instruction concurrently to each of respective decode units 202a and 202b during each processor cycle. Steering logic 203 within decode/issue units 202a and 202b determines whether to provide the instruction to ld/st ex queues 204a or ld/st ex queues 204b. In this manner, by selecting one of queues 204a or 204b to which to direct an ld/st instruction, steering logic 203 determines which independent cache, L1 data cache 0 or L1 data cache 1, will receive the request address for the ld/st instruction. Furthermore, in some embodiments, steering logic 203 utilizes prediction information stored in prediction bits storage circuitry 219 to appropriately direct the instructions.

Therefore, in single thread mode, decode units 202a and 202b issue instructions to load/store execution queues 204a and 204b. However, in multi-thread mode, decode units 202a, 202b are restricted to issue instructions to load/store execution queue 204a and decode units 202c, 202d are restricted to load/store execution queue 204b.

Decode units 202 may include logic or logic instructions to multiplex valid instructions, decode instructions for instruction type, source, and destination operands, generate queue entries and tags for instructions, determine source and destination register dependencies between decoded instructions, check dependency with previous instructions in execution queues 204, and separate complex instructions into microinstructions. Decode units 202 can also handle issuing serialized instructions such as instruction exceptions (e.g., Translation Look-aside Buffer miss, breakpoint, and illegal instruction), software interrupts (SWI), and instructions that modify processor configuration and states. Decode units 202 can also update renaming in register files 208 for issued instructions. Queues 204 may be designed to have optimal size for normal execution.

Microprocessors that require instructions to be executed in-order experience long delays when data required to execute the instruction is not found in cache memory, i.e., a cache miss occurs. Microprocessors that allow out-of-order execution include a replay queue for instructions that experience a data cache miss and constantly check for availability of source operands in order to execute instructions. Further, instructions that depend on one another may fill the execution queue and block the execution of independent instructions. In contrast, processor 102 can further schedule execution of instructions using Id/st arbiter 206 to arbitrate execution of load/store instructions in Id/st ex queues 204 both in-order and out-of-order. Each execution pipeline 218a, 218b of processor 102 includes multiple Id/st ex queues 204 to hold the dependent instructions that experience a cache miss in the same queue until completion instead of replaying or re-issuing instructions while independent instructions are free to issue from other execution queues. Additionally, when an instruction issues, since the instructions in queues 204 can be in-order, data for source operands will be available from result forwarding of an immediate prior instruction in the same queue or from register file 208a. In many cases, it is possible to statistically determine when data for the source operands of an instruction will be available and schedule accordingly. However, in some cases, such as L1 data cache misses, the data may not be available as expected. In cases where instructions are dependent on two load instructions, the dependent instructions can be sent to two different queues 204. The dependent instruction in one of queues 204 will then be invalidated when the copy of the instruction reaches the head of another of queues 204.

Ld/st arbiters 206 send instructions to load/store execution units 210. Load instructions from Id/st ex queues 204 dispatch to load/store execution units 210 and will remain in a respective queue 204 until data is returned in the next clock cycle, effectively blocking all dependent instructions until valid data is returned in the next clock cycle. Ld/st execution units 210 can send data ready signals to queues 204 when a cache hit is detected from L1 data cache 0 216a. The bottom entries of Id/st ex queues 204 can send an entry or tag that includes time stamp information to Id/st arbiter 206. The time stamp information allows Id/st arbiter 206 to determine and send the oldest instruction to Id/st execution units 210. Alternatively, load/store arbiter 206 can receive and send instructions on a round robin basis, where the first instruction that reaches arbiter 206 is the first instruction sent to load/store execution units 210. The round robin basis is matched by decode units 202 for issuing independent load/store instructions to load/store execution queue 204.

L1 data cache 0 216a returns a hit/miss indication to Id/st execution unit 210a, and L1 data cache 1 216b returns a hit/miss indication to Id/st execution unit 210b. In addition, if the particular memory operation is a load and results in a cache hit, data cache 216a forwards the corresponding load data to Id/st execution unit 210a and data cache 216b forwards the corresponding load data to Id/st execution unit 210b. When operating in single thread mode, in response to a cache hit for a load instruction, L1 data cache 0 216a may return data to Id/st execution unit 210b, and, in response to cache hit for a load instruction, L1 data cache 1 216b may return data to Id/st execution unit 210a. Also, when operating in single thread mode, L1 data caches 216 are configured to bidirectionally communicate with each other in order to allow each cache to continue to operate independently. Operation of L1 data caches 216 in single thread mode will be described further below with respect to FIGS. 3-10.

Figure 3:
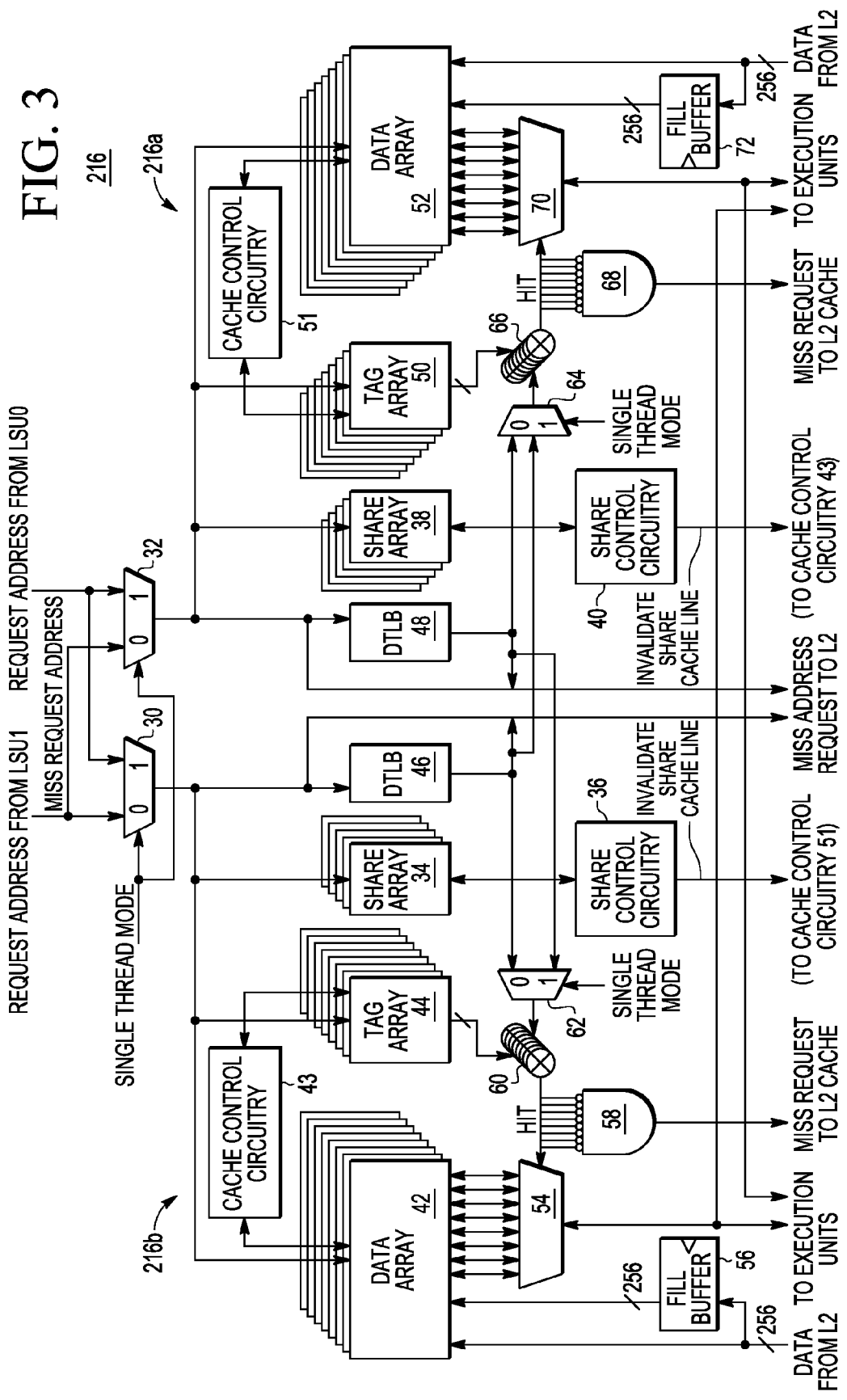
FIG. 3 illustrates, in block diagram form, the L1 data cache 0 and the L1 data cache 1 of FIG. 2 in accordance with one embodiment of the present disclosure.

FIG. 3 illustrates, in block diagram form, L1 data cache 0 216a and L1 data cache 1 216b in accordance with one embodiment of the present disclosure. L1 data cache 0 216a includes data array 52, TAG array 50, share array 38, data TLB (DTLB) 48, cache control circuitry 51, share control circuitry 40, multiplexors (MUXes) 32, 64, and 70, comparator 66, miss determination circuitry 68, and fill buffer 72. L1 data cache 1 216b includes data array 42, TAG array 44, share array 34, data TLB (DTLB) 46, cache control circuitry 43, share control circuitry 36, multiplexors (MUXes) 30, 62, and 54, comparator 60, miss determination circuitry 58, and fill buffer 56. MUX 30 receives a request address from LSU1 (corresponding to a load or store instruction) as a first data input, receives a request address from LSU0 (corresponding to a load or store instruction) as a second data input, and a single thread mode indicator as a control input, and provides an output signal to each of DTLB 46, share array 34, TAG array 44, and data array 42. MUX 32 receives the request address from LSU0 as a first data input, receives the request address from LSU1 as a second data input, and the single thread mode indicator as a control input, and provides an output signal to each of DTLB 48, share array 38, TAG array 50, and data array 52. MUX 62 receives an output of DTLB 46 as a first data input, an output of DTLB 48 as a second data input, and the single thread mode indicator as the control input and provides an output to comparators 60. MUX 64 receives an output of DTLB 48 as a first data input, an output of DTLB 46 as a second data input, and the single thread mode indicator as the control input and provides an output to comparators 66.

The output of MUX 30 and MUX 32 is provided DTLBs 46 and 48, respectively, such that the virtual request address provided by the Id/st execution units 210 can be translated to physical addresses at the output of DTLBs 46 and 48, respectively. Therefore, since TAG arrays 44 and 50 of L1 data caches 216 correspond to physical addresses, comparators 60 and 66 can compare the tag addresses to the appropriate physical address from DTLBs 46 and 48, as will be described below. Note that DTLB 46 provides translated addresses for L1 data cache 1 216b and DTLB 48 provides translated addressees for L1 data cache 0 216a. In one embodiment, DTLBs 46 and 48 are not located within L1 data caches 216 and is located in MMU 112 which is coupled to L1 data caches 216.

In the illustrated embodiment, each L1 data cache 216 is implemented as an N-way set associative cache. Therefore, each of TAG arrays 44 and 50 provide N outputs, one for each way, corresponding to the TAG address for the selected set. (Note that a portion of the received request address can be used to indicate the selected set of the caches.) Comparators 60 and 66 each receive N TAG addresses from TAG array 44 and 50, respectively, and compares each of the N TAG addresses (which may be qualified by a respective valid bit in each TAG entry) to the outputs of MUXes 62 and 64, respectively. In response to the comparisons, comparators 60 and 66 each generate N hit indicator signals, one for each way. If a hit signal is asserted, it indicates that the received address hit in the corresponding way of the cache, and if negated, indicates that the received address miss in the corresponding way of the cache. The hit indicators from comparators 60 are provided to MUX 54 which receives N data outputs from DATA array 42, one for each way. The hit signals from comparators 60 are provided to the control of MUX 54 such that if any of the hit indicators from comparators 60 is asserted, the data from the cache line of the selected set of the appropriate way is provided as the output of MUX 54 to the execution units (e.g. Id/st execution units 210). Also, for a request address for a load instruction which results in a miss in L1 data cache 1 216b, data from the L2 cache (which may be located within cache 114), can be provided directly to data array 42 or may be provided by way of fill buffer 56 to data array 42. The hit indicators from comparators 60 are also provided to miss determination circuitry 58, which may be implemented as an AND gate with inverting inputs, such that if no hit signal is asserted, a miss request signal for L1 data cache 1 is asserted and provided to the L2 cache. The hit indicators from comparators 66 are provided to MUX 70 which receives N data outputs from DATA array 52, one for each way. The hit signals from comparators 66 are provided to the control of MUX 70 such that if any of the hit indicators from comparators 66 is asserted, the data from the cache line of the selected set of the appropriate way is provided as the output of MUX 70 to the execution units (e.g. ld/st execution units 210). Also, for a request address for a load instruction which results in a miss in L1 data cache 0 216*a*, data from the L2 cache (which may be located within cache 114), can be provided directly to data array 52 or may be provided by way of fill buffer 72 to data array 52. The hit indicators from comparators 66 are also provided to miss determination circuitry 68, which may be implemented as an AND gate with inverting inputs, such that if no hit signal is asserted, a miss request signal for L1 data cache 0 is asserted and provided to the L2 cache.

Also, as will be described in more detail below, the received request address from MUX 30 is also provided to share array 34, in which, in response to the request address, provides a share bit, an index number of the other cache (L1 data cache0 216*a*), and a way number of the other cache (L1 data cache0 216*a*) to share control circuitry 36. Therefore, in one embodiment, share array 34 includes a share entry corresponding to each cache line of L1 data cache1 216*b* in which each share entry includes a share indicator (which indicates whether the corresponding cache line is shared with another cache, and may be implemented as a share bit), a corresponding index number of the other cache, and a corresponding way number of the other cache (in which the index number and way number be referred to as a location indicator and which point to the shared cache line in the other cache). Share control circuitry 36 provides an invalidate share cache line signal to cache control circuitry 51 of L1 data cache0 216*a*. Similarly, the received request address from MUX 32 is provided to share array 38, in which, in response to the request address, provides a share indicator, an index number of the other cache (L1 data cache1 216*b*), and a way number of the other cache (L1 data cache1 216*b*) to share control circuitry 40. Therefore, in one embodiment, share array 38 includes a share entry corresponding to each cache line of L1 data cache0 216*a* in which each share entry includes a share indicator (e.g. share bit), a corresponding index number of the other cache, and a corresponding way number of the other cache corresponding to each cache line of L1 data cache0 216*a*. Share control circuitry 40 provides an invalidate share cache line signal to cache control circuitry 43 of L1 data cache1 216*b*. (Note that, in the share entries of share array 34 and 38, the index number of the other cache may also be referred to as the set number of the other cache, since it indicates a particular set of the other cache.

L1 data cache 0 216*a* and L1 data cache 1 216*b* are configurable to operate in either single thread mode or multi-thread mode. In the case of multi-thread mode, in which the single thread mode indicator is negated, MUX 30 provides the request address from LSU1 to L1 data cache 1, MUX 32 provides the request address from LSU0 to L1 data cache 0, MUX 62 provides the output of DTLB 46 (corresponding to L1 data cache 1) to comparators 60, and MUX 64 provides the output of DTLB 48 (corresponding to L1 data cache 0) to comparators 66. Also, the output of MUX 54 is provided back to LSU1 and the output of MUX 70 is provided back to LSU0.

In this manner, in multi-thread mode, each L1 data cache operates independently with its corresponding ld/st execution unit. However, in the case of single thread mode, although each of the L1 data caches 216 continue to operate independently, they communicate with each other as needed. For example, the single thread mode indicator can be asserted such that MUX 30 provides the request address from LSU0 to L1 data cache 1, and MUX 62 provides the physical address from DTLB 48 to L1 data cache 1. Also, with the single thread mode indicator asserted, MUX 32 provides the request address from LSU1 to L1 data cache 0, and MUX 64 provides the physical address from DTLB 46 to L1 data cache 0. The output of MUX 54 of L1 data cache 1 can be provided to LSU0 and the output of MUX 70 of L1 data cache 0 can be provided to LSU1. Therefore, in single thread mode, rather than restricting L1 data cache use to L1 data cache 0 in which L1 data cache 1 remains unused, both L1 data cache 0 and L1 data cache 1 continue to be used, each operating independently (in which neither operates as a victim cache to the other). Operation of L1 data caches 216 in single thread mode will be further described in reference to the flow diagrams of FIGS. 4-10.

L1 data caches 216 are capable of operating either in write through mode or copy back mode. In write through mode, when an update is made to the cache, it is also written through to the other corresponding memory locations (such as in L2 and other higher level caches and main memory) such that memory is maintained coherent at the time an entry is updated in the L1 cache. In copy back mode, when updates are made to the cache, the updates are not immediately made to other memory locations to maintain coherency. Instead, status bits in accordance with a particular protocol (such as the MESI protocol, which is well known in the art) may be used and updated accordingly to indicate whether or not a cache line is coherent with memory. In the illustrated embodiments of FIGS. 8, 9, and 10, it is assumed that the caches operate in copy back mode in accordance with the MESI protocol. With the MESI protocol, each cache line includes a modified (M) bit to indicate whether the cache line is modified, i.e. dirty, with respect to memory and thus non-coherent, an exclusive (E) bit to indicate whether the cache line is exclusive to the current cache, a shared (S) bit to indicate whether the cache line is shared with other caches, and an invalid (I) bit to indicate whether the cache line is valid or not. Cache operations, such as a flush, can then be used to make cache data coherent with memory.

FIGS. 4-10 describe executions of load and store instructions in single thread mode. As discussed above, in single thread mode, load and store instructions can be directed or steered to either ld/st execution queues 204*a* or 204*b* by steering logic 203. In this manner, steering logic 203 determines whether each particular load or store instruction is directed to LSU0 and L1 data cache 0 or to LSU1 and L1 data cache 1. In one embodiment, a fixed steering mechanism is used to determine how to direct the instruction. In one embodiment, a characteristic of the register number which holds the base address of the load or store instruction is used to direct the instruction. For example, in register files 208, each register has an associated register number. In one embodiment, each register file 208 includes 32 registers, R0-R31. Thus, each register has an associate number 0 to 31. Register files 208 are general purpose registers and are defined by the system architecture of each processor. Furthermore, during decode, the number of the register which holds the base address of the instruction (referred to as the base address register number) can be determined. Therefore, decode/issue units 202 can determine this information. In one fixed steering mechanism, the instruction is directed based on whether the register number of the base address is an odd or an even numbered register. In other fixed steering mechanisms, additional information may be used to direct the instructions. For example, a hashing of the register number of the base address together with the register number of the offset may be used, such that if the hashing result is even, it is directed to one data cache, and if odd, to the other data cache. Alternatively, a hashing of the register number of the base address together with offset in the offset register can be performed.

In another embodiment, consecutive load instructions with different base address registers may be directed to different caches. That is, consecutive load instructions may be alternately directed to different caches, in which subsequent accesses using the same base address number would also be sent to the same cache. For example, if a first encountered load instruction has a base address register of R3, then this load instruction can be directed to LSU0 and L1 data cache0. Furthermore, all future load/store instructions which use R3 as the base address register would also be directed to LSU0 and L1 data cache0. In this example, if a next consecutive load instruction has a base address register of R9, then this next consecutive load instruction can be directed to LSU1 and L1 data cache1. Furthermore, all future load/store instructions which use R9 as the base address register would also be directed to LSU1 and L1 data cache1. Similarly, for a next consecutive load instruction which uses a different base address than R3 or R9, it (as well as future instructions using the same base address as this instruction) would be directed to LSU0 and L1 data cache0. In this manner, consecutive load instruction with different base address registers are directed to different caches, and subsequent instructions which use the same base address as a previous load instruction which was previously directed to a particular cache is also directed to that same particular cache.

In yet another embodiment, groups of consecutive register numbers may be defined which cause an instruction to be directed to one cache or the other. For example, if the base address register is one of registers 0-15, the instruction may be directed to one cache and if it is one of registers 16-31, the instruction may be directed to the other cache. Note that the register groupings may be stored in user programmable storage circuitry. Also, note that other aspects of the load or store instruction, other than the register which holds the base address, may be used by steering logic 203 to appropriately direct the instructions.

In other embodiments, predictive steering mechanisms may be used to direct a particular load or store instruction to one cache or another. For example, a prediction bit or prediction indicator may be stored for each register in register file 208a and 208b to indicate whether, when the base address is provided in the corresponding register, the instruction is directed to cache 0 or cache 1. This may be initially set up to be a particular value (e.g. all odd registers can have its corresponding prediction bit asserted to indicate it goes to one cache and all even registers can have its corresponding prediction bit negated to indicate it goes to the other cache.) These prediction bits may then be modified, as needed, during operation to change their prediction. For example, when a miss occurs in the cache originally indicated by a prediction bit, but it hits in the other cache, the prediction bit can be changed to indicate the other cache. Furthermore, each prediction bit may have a corresponding qualifier bit which indicates whether to use the corresponding prediction bit or another steering mechanism (such as any of those fixed mechanisms described above) to direct the instruction. These prediction bits and qualifier bits, if present, can be collectively referred to as prediction bits (or prediction indicators) and stored in prediction bits storage circuitry 219. Note that any number of bits may be used to provide a prediction indicator for each register in register files 208.

Figure 4:
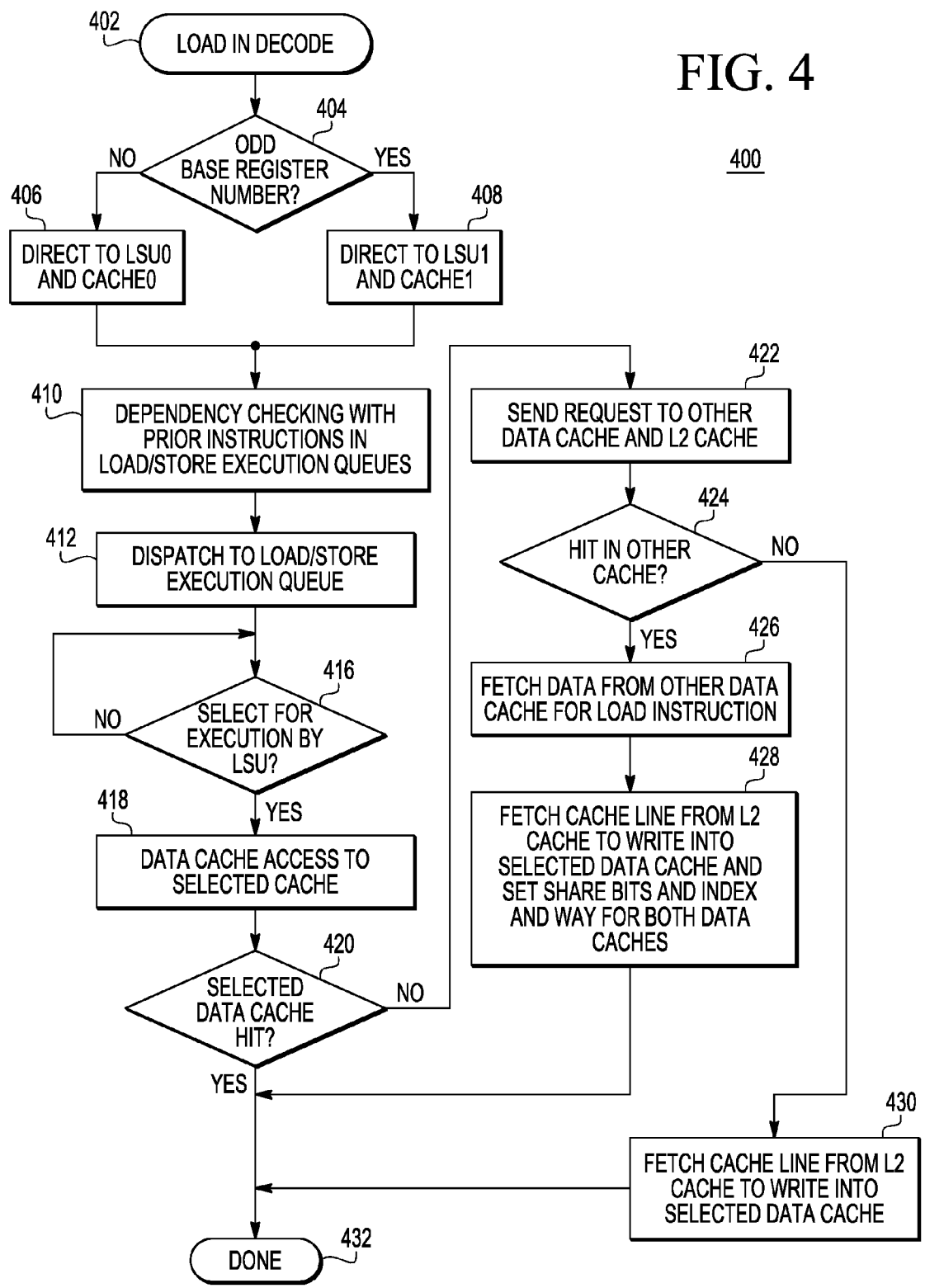
FIG. 4 illustrates, in flow diagram form, a method of steering a load instruction in which the L1 data cache 0 and the L1 data cache 1 of FIG. 3 operate in write through mode, in accordance with one embodiment of the present disclosure.

FIG. 4 illustrates, in flow diagram form, a method 400 of executing a load instruction in single thread mode in which L1 data caches 216 operate in write through mode, in accordance with one embodiment of the present disclosure. For the method of FIG. 4, a fixed steering mechanism, based on whether the register number of the register containing the base address of the load instruction is odd or even, is used to direct the instruction to the appropriate cache. Method 400 begins with block 402 in which a load instruction is received in decode (e.g. by decode/issue unit 202a or 202b). Method 400 continues to decision diamond 404 in which it is determined whether the register number of the base address register is odd or even. If it is even, method 400 proceeds to block 406 in which steering logic 203 of the corresponding decode/issue unit directs the load instruction to LSU0 and L1 data cache 0 (and thus the instruction will be provided to Id/st ex queues 204a). If it is odd, method 400 proceeds to block 408 in which steering logic 203 of the corresponding decode/issue unit directs the load instruction to LSU1 and L1 data cache 1 (and thus the instruction will be provided to Id/st ex queues 204a).

After block 406 and 408, the method proceeds to block 410 in which dependency checking with prior instructions in the selected group of Id/st execution queues 204 is performed. For example, if L1 data cache0 is selected, the dependency checking is performed on prior instructions in queues 204a, and if L1 data cache1 is selected, the dependency checking is performed on prior instructions in queues 204b. The method proceeds to block 412 in which the load instruction is dispatched to an appropriate queue of the selected group of queues (in 204a or 204b), based on the dependency checking previously performed. For example, as described above, if the current load instruction is dependent on an instruction already within a queue, it is placed in the same queue. The method then proceeds to decision diamond 416 in which the load instruction waits to be selected by execution by the selected LSU. For example, if LSU0 was selected, then the load instruction waits in one of the queues of queues 204a until selected by Id/st arbiter 206a for execution by LSU0, and if LSU1 was selected, then the load instruction waits in one of the queues of queue 204b until selected by Id/st arbiter 206b for execution by LSU1.

Once the load instruction is selected for execution, flow proceeds to block 418 in which the data cache access to the selected cache (L1 data cache 0 or L1 data cache 1) is performed. For example, if the selected cache is L1 data cache 0, the request address of the load instruction is provided to L1 data cache 0 and if the selected cache is L1 data cache 1, the request address of the load instruction is provided to L1 data cache 1. Therefore, as seen in FIG. 3, for this data cache access, the single thread mode indicator may still be negated so as to allow the request address from the selected execution unit to be provided to the selected cache such that a hit/miss may be determined, as was described above in reference to FIG. 3. Also, the DTLB of the corresponding cache is used for this hit/miss determination. Referring back to FIG. 4, method 400 then proceeds to decision diamond 420 in which it is determined if a hit occurred in the selected data cache. If so, the desired data for the load instruction has been located in the selected cache, and the selected cache can provide the data back to the selected LSU, and the method ends at done 432. However, if a miss occurred in the selected data cache, method 400 proceeds to block 422. At this point, the single thread mode indicator may be asserted to configure L1 data caches 216 appropriately, as was described above.

In block 422, the access request for the load instruction is sent to the other L1 data cache as well as the L2 cache. For example, if L1 data cache 0 was originally selected by decision diamond 404, then the other cache would be L1 data cache 1. In this example, with the single thread mode indicator asserted, MUX 30 can now provide the request address from selected LSU0 to the other data cache, L1 data cache 1. Also, MUX 62 provides the physical address from DTLB 48 to comparators 60. In this manner, the request address is provided to the other cache to determine whether a hit or miss occurs in this other cache. Method 400 proceeds to decision diamond 424 in which it is determined whether the request address resulted in a hit in the other cache. If so, method 400 proceeds to block 426 in which the data for the load instruction is provided to the selected LSU from the other data cache. Method 400 then proceeds to block 428 in which the entire cache line is fetched from the L2 cache to be written into the selected data cache. In this manner, both data caches, the selected data cache and the other data cache (i.e. both L1 data cache 0 and L1 data cache 1), store the same cache line. Also, the share bits for both data caches are also set (i.e. asserted), and the corresponding index and ways are stored for both data caches. Therefore, referring to FIG. 3, the fill buffer of the selected cache (either fill buffer 56 or 72) can be used to receive the cache line from L2 for storage into the selected cache. Note that any appropriate allocation scheme may be used to store the new cache line. In one embodiment, the cache allocation may be performed by the appropriate cache control circuitry (either cache control circuitry 43 or 51). Also, the cache line can be obtained from L2 because since caches 216 operate in write through mode, it is known that if the cache line hits in one of caches 0 or 1, it also exists in L2. Also, the share bit of the share array of the selected cache (e.g. share array 38 of L1 data cache 0) in the share entry which corresponds to the cache entry in which the cache line from L2 was written is set (i.e. asserted), and the index and way of the other cache (e.g. L1 data cache1) which stores the same cache line is also stored to the share entry. Similarly, the share bit of the share array of the other cache (e.g. share array 34 of L1 data cache 1) in the share entry which corresponds to the cache entry in which the cache line is stored is set (i.e. asserted), and the index and way of the other cache (e.g. L1 data cache0) which stores the same cache line is also stored to the share entry. In this manner, the share arrays keep track of whether a cache line is also present in the other cache and, if so, in which location. As will be described below, the share arrays may then be used when processing store instructions.

If, at decision diamond 424, the request address resulted in a miss in the other cache, method 400 proceeds to block 430 in which the cache line is fetched from the L2 cache to be written into the selected data cache. Note that in this case, the cache line will be in both the L2 cache and the selected L1 data cache, but not in the other L1 data cache. After blocks 428 and 430, method 400 then ends at done 432.

Figure 5:
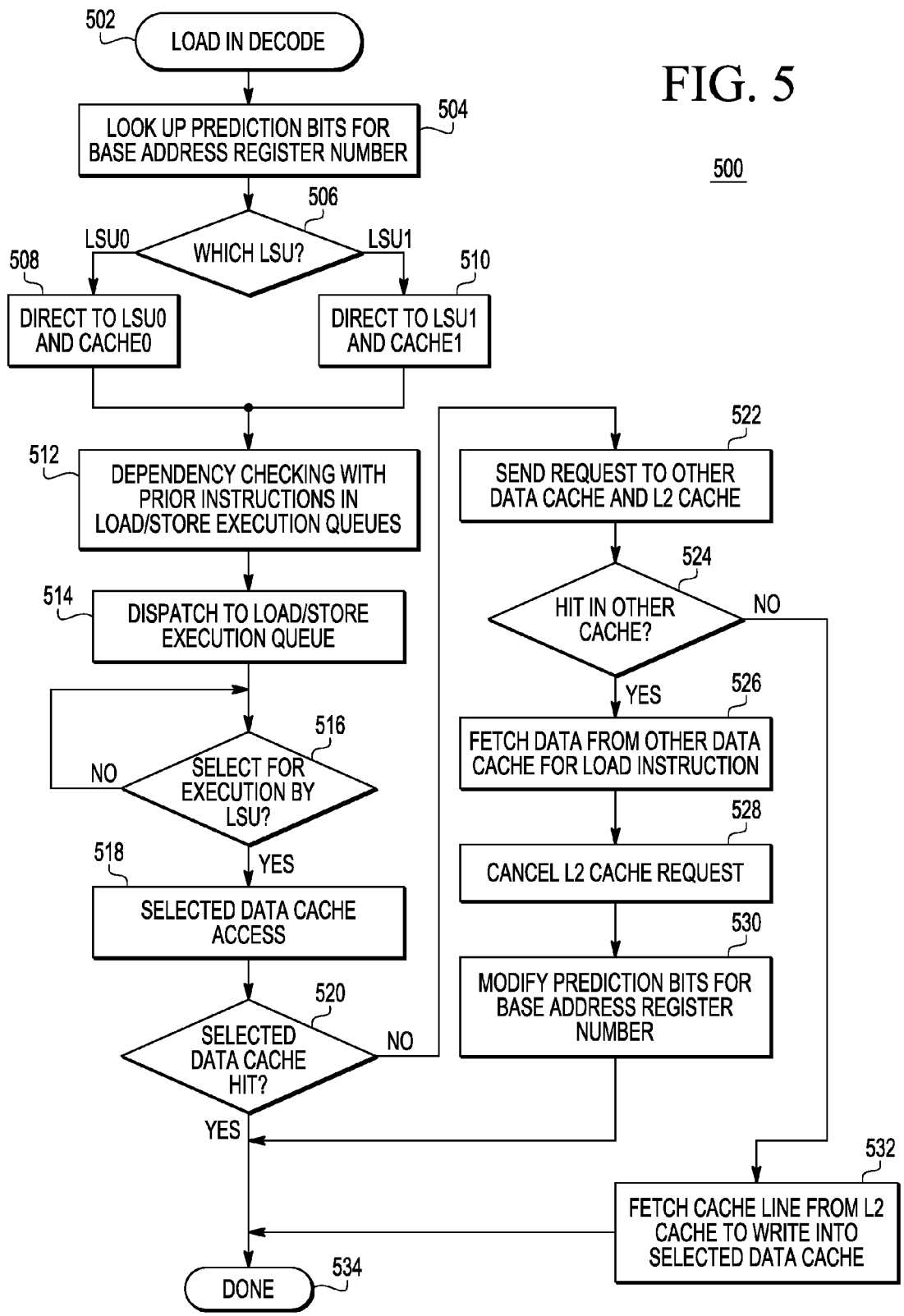
FIG. 5 illustrates, in flow diagram form, a method of steering a load instruction in which the L1 data cache 0 and the L1 data cache 1 of FIG. 3 operate in write through mode, in accordance with one embodiment of the present disclosure.

FIG. 5 illustrates, in flow diagram form, a method 500 of executing a load instruction in single thread mode in which L1 data caches 216 operate in write through mode, in accordance with one embodiment of the present disclosure. For the method of FIG. 5, a predictive steering mechanism, in which one or more prediction bits corresponding to each register of register files 208a and 208b may be stored, for example, in storage circuitry 219. As discussed above, for each register in register files 208a and 208b, one prediction bit may indicate to which L1 data cache the access should be directed when the base address of the access is stored in the corresponding register. In one embodiment, another prediction bit (i.e. a qualifier bit) for each register may be used to indicate whether the prediction bit should be used or if another method, such as the steering method of FIG. 4, should be used. Method 500 begins with block 502 in which a load instruction is received in decode (e.g. by decode/issue unit 202a or 202b). Method 500 continues to block 504 in which the one or more prediction bits for the base address register number are looked up (e.g. obtained from storage circuitry 219). The base address register number refers to the register number of the register indicated by the load instruction as storing the base address for the load instruction. Method 500 then continues to decision diamond 506 in which it is determined, based on the one or more prediction bits, whether to direct the load instruction to LSU0 (and thus L1 data cache 0) or LSU1 (and thus L1 data cache 1). For example, in one embodiment, if the prediction bit for the base address register is at a first logic level (e.g. logic level "0"), then the load instruction is directed to LSU0, and if the prediction bit is at a second logic level (e.g. logic level "1"), then the load instruction is directed to LSU1. In the illustrated embodiment, the prediction bit is used to steer the load instruction to the appropriate LSU and cache. In another embodiment, a qualifier bit is also used, such that the load instruction is directed based on the prediction bit when the qualifier bit has a first logic state. In this example, if the qualifier bit has a second logic state, then a default steering mechanism may be used. This steering mechanism may direct the load instruction to LSU0 or LSU1 based on whether the base address register number is odd or even. Alternatively, other steering mechanisms may be used as the default.

Referring to decision diamond 506, if, based on the one or more prediction bits, the load instruction is directed to LSU0, method 500 proceeds to block 508 in which steering logic 203 of the corresponding decode/issue unit directs the load instruction to LSU0 and L1 data cache 0 (and thus the instruction will be provided to Id/st ex queues 204a). If, based on the one or more prediction bits, the load instruction is directed to LSU1, method 500 proceeds to block 510 in which steering logic 203 of the corresponding decode/issue unit directs the load instruction to LSU1 and L1 data cache 1 (and thus the instruction will be provided to Id/st ex queues 204a).

After blocks 508 and 510, the method proceeds to block 512 in which dependency checking with prior instructions in the selected group of Id/st execution queues 204 is performed. For example, if L1 data cache 0 is selected, the dependency checking is performed on prior instruction in queues 204a, and if L1 data cache 1 is selected, the dependency checking is performed on prior instructions in queues 204b. The method proceeds to block 514 in which the load instruction is dispatched to an appropriate queue of the selected group of queues (in 204a or 204b), based on the dependency checking previously performed. For example, as described above, if the current load instruction is dependent on an instruction already within a queue, it is placed in the same queue. The method then proceeds to decision diamond 516 in which the load instruction waits to be selected by execution by the selected LSU. For example, if LSU0 was selected, then the load instruction waits in one of the queues of queues 204a until selected by Id/st arbiter 206a for execution by LSU0, and if LSU1 was selected, then the load instruction waits in one of the queues of queue 204b until selected by Id/st arbiter 206b for execution by LSU1.

Once the load instruction is selected for execution, flow proceeds to block 518 in which the data cache access to the selected cache (L1 data cache 0 or L1 data cache 1) is performed. For example, if the selected cache is L1 data cache 0, the request address of the load instruction is provided to L1 data cache 0 and if the selected cache is L1 data cache 1, the request address of the load instruction is provided to L1 data cache 1. Therefore, as seen in FIG. 3, for this data cache access, the single thread mode indicator may still be negated so as to allow the request address from the selected execution unit to be provided to the selected cache such that a hit/miss may be determined, as was described above in reference to FIG. 3. Also, the DTLB of the corresponding cache is used for this hit/miss determination. Referring back to FIG. 5, method 500 then proceeds to decision diamond 520 in which it is determined if a hit occurred in the selected data cache. If so, the desired data for the load instruction has been located in the selected cache, and the selected cache can provide the data back to the selected LSU, and the method ends at done 534. However, if a miss occurs in the selected data cache, method 500 proceeds to block 522. At this point, the single thread mode indicator may be asserted to configure L1 data caches 216 appropriately, as was described above.

In block 522, the access request for the load instruction is sent to the other L1 data cache as well as the L2 cache. For example, if L1 data cache 0 was originally selected by decision diamond 506, then the other cache would be L1 data cache 1. In this example, with the single thread mode indicator asserted, MUX 30 can now provide the request address from selected LSU0 to the other data cache, L1 data cache 1. Also, MUX 62 provides the physical address from DTLB 48 to comparators 60. In this manner, the request address is provided to the other cache to determine whether a hit or miss occurs in this other cache. Method 500 proceeds to decision diamond 524 in which it is determined whether the request address resulted in a hit in the other cache. If so, method 500 proceeds to block 526 in which the data for the load instruction is provided to the selected LSU from the other data cache. Method 500 then proceeds to block 528 in which the access request which was sent to the L2 cache in block 522 is cancelled. Method 500 then proceeds to block 530 in which the one or more prediction bits for the base address register number is modified. For example, in the current example in which a single prediction bit is used to indicate either LSU0 or LSU1, the prediction bit value corresponding to the base address register number of the current load instruction is toggled such that it now indicates or "predicts" that the access address is in the "other cache" (i.e. not the cache that was originally selected at decision diamond 506). That is, if LSU0 was originally selected at decision diamond 506 due to the prediction bit of the base address register number of the current load instruction, upon modification of the prediction bit in block 530, the prediction bit of that base address register number would now indicate LSU1. Method 500 then proceeds to done 534.

If, at decision diamond 524, the request address resulted in a miss in the other cache, method 500 proceeds to block 532 in which the cache line is fetched from the L2 cache to be written into the selected data cache. Note that in this case, the cache line will be in both the L2 cache and the selected L1 data cache, but not in the other L1 data cache. That is, in this example, L1 data cache0 and L1 data cache1 are mutually exclusive. After blocks 532, method 500 then ends at done 534.

Figure 6:
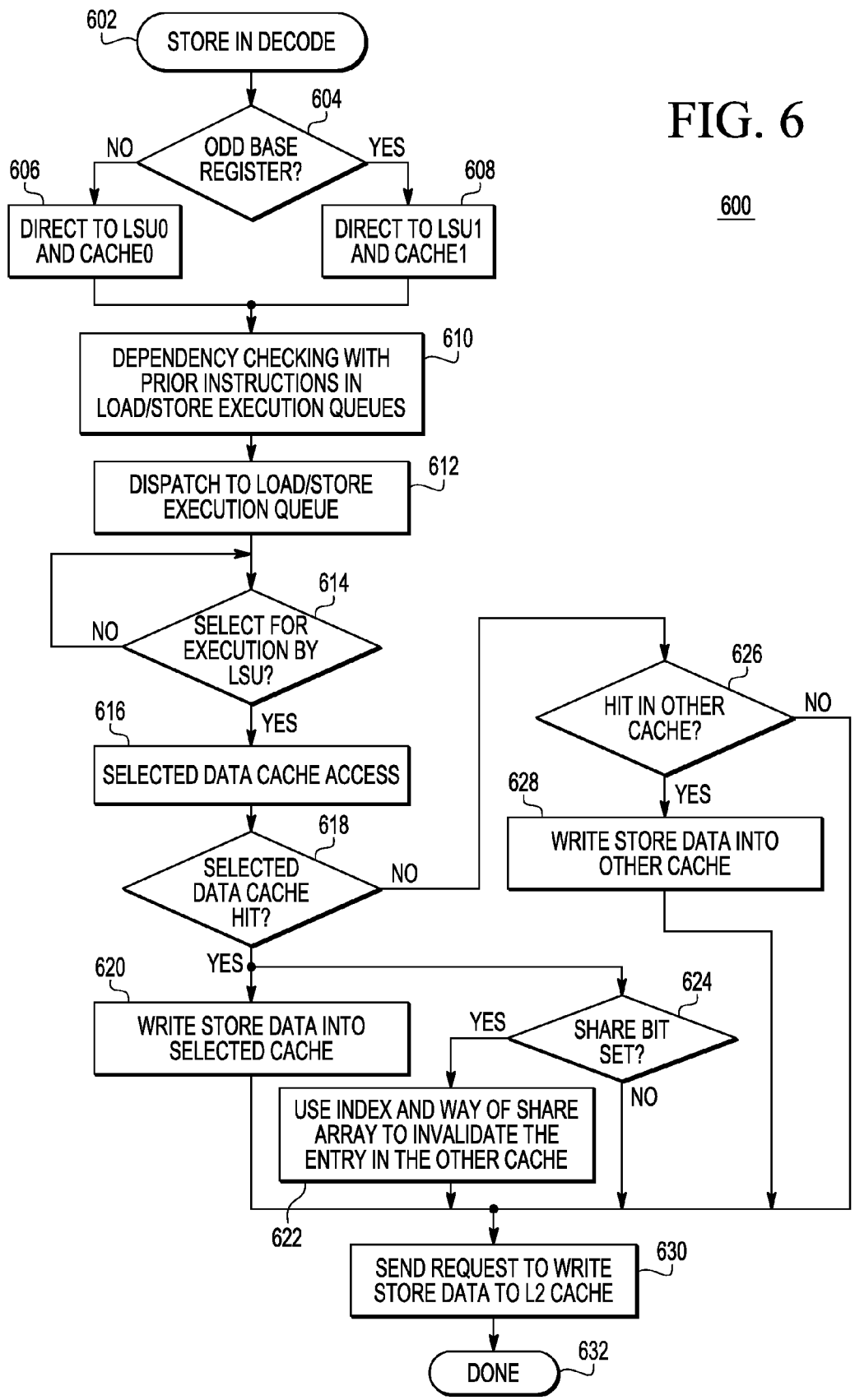
FIG. 6 illustrates, in flow diagram form, a method of steering a store instruction in which the L1 data cache 0 and the L1 data cache 1 of FIG. 3 operate in write through mode, in accordance with one embodiment of the present disclosure.

FIG. 6 illustrates, in flow diagram form, a method 600 of executing a store instruction in single thread mode in which L1 data caches 216 operate in write through mode, in accordance with one embodiment of the present disclosure. For the method of FIG. 6, a fixed steering mechanism, based on whether the register number of the register containing the base address of the load instruction is odd or even, is used to direct the instruction to the appropriate cache. Method 600 begins with block 602 in which a store instruction is received in decode (e.g. by decode/issue unit 202a or 202b). Method 600 continues to decision diamond 604 in which it is determined whether the register number of the base address register is odd or even. If it is even, method 600 proceeds to block 606 in which steering logic 203 of the corresponding decode/issue unit directs the store instruction to LSU0 and L1 data cache 0 (and thus the instruction will be provided to ld/st ex queues 204a). If it is odd, method 600 proceeds to block 608 in which steering logic 203 of the corresponding decode/issue unit directs the store instruction to LSU1 and L1 data cache 1 (and thus the instruction will be provided to ld/st ex queues 204a).

After blocks 606 and 608, the method proceeds to block 610 in which dependency checking with prior instructions in the selected group of ld/st execution queues 204 is performed. For example, if L1 data cache 0 is selected, the dependency checking is performed on prior instruction in queues 204a, and if L1 data cache 1 is selected, the dependency checking is performed on prior instructions in queues 204b. The method proceeds to block 612 in which the store instruction is dispatched to an appropriate queue of the selected group of queues (in 204a or 204b), based on the dependency checking previously performed. For example, as described above, if the current store instruction is dependent on an instruction already within a queue, it is placed in the same queue. The method then proceeds to decision diamond 614 in which the store instruction waits to be selected for execution by the selected LSU. For example, if LSU0 was selected, then the store instruction waits in one of the queues of queues 204a until selected by ld/st arbiter 206a for execution by LSU0, and if LSU1 was selected, then the store instruction waits in one of the queues of queue 204b until selected by ld/st arbiter 206b for execution by LSU1.

Once the store instruction is selected for execution, the method proceeds to block 616 in which the data cache access to the selected cache (L1 data cache 0 or L1 data cache 1) is performed. For example, if the selected cache is L1 data cache 0, the request address of the store instruction is provided to L1 data cache 0 and if the selected cache is L1 data cache 1, the request address of the store instruction is provided to L1 data cache 1. Note that the descriptions provided above with respect to FIGS. 4 and 5 as to how the circuitry of FIG. 3 may be configured so as to direct the request address to the appropriate L1 data cache also apply here. Method 600 then proceeds to decision diamond 618 in which it is determined if a hit occurred in the selected data cache. If so, method 600 proceeds to block 620 in which the store data corresponding to the store instruction is written to the cache line which resulted in the hit. From decision diamond 618, when a hit occurs in the selected data cache, the method also proceeds to decision diamond 624. At decision diamond 624, it is determined whether the share bit is set (i.e. asserted). For example, referring to FIG. 3, the share control circuitry of the selected cache can check the share bit of the share entry which corresponds to the cache line of the selected cache which resulted in the hit and determine if it is set. If it is set, then the cache line is also present in the other cache, and the method proceeds to block 622 in which the index and way stored in the share entry of the share array of the selected cache is used to invalidate that cache entry in the other cache. For example, the share control circuitry of the selected cache can provide an invalidate share cache line signal (which may include the index and way of the share entry) to the cache control circuitry of the other cache so that the cache control circuitry of the other cache may invalidate the appropriate cache entry indicated by the index and way of the share entry. If, at decision diamond 624, the share bit is not asserted, the method proceeds to block 630. Also, after either blocks 620 or 622, the method also proceeds to block 630. In block 630, a request to write the store data corresponding to the store instruction is sent to the L2 cache. In this manner, both the selected L1 data cache and the L2 cache will be updated with the store data. Note that, since L1 data caches 216 operate in write through mode in method 600, L2 is updated whenever either L1 data cache 0 or L1 data cache 1 is updated. The method then ends at done 632.

If, at decision diamond 618, a miss occurs in the selected data cache, method 600 proceeds to decision diamond 626 in which it is determined whether the access address for the store instruction hits in the other L1 data cache. For example, if L1 data cache 0 was originally selected by decision diamond 404, then the other cache would be L1 data cache 1. Note that the descriptions provided above with respect to FIGS. 4 and 5 as to how the circuitry in FIG. 3 may be configured and operated to appropriately send the request to the other cache may also apply here. If, at decision diamond 626, a hit occurs in the other L1 data cache, the store data corresponding to the store instruction is written to the cache line which resulted in the hit. Method 600 then proceeds to block 630, in which the request is also sent to the L2 cache, as described above. If, at decision diamond 626, a miss occurs, method 600 continues to block 630 so that L2 may be updated with the store data.

Figure 7:
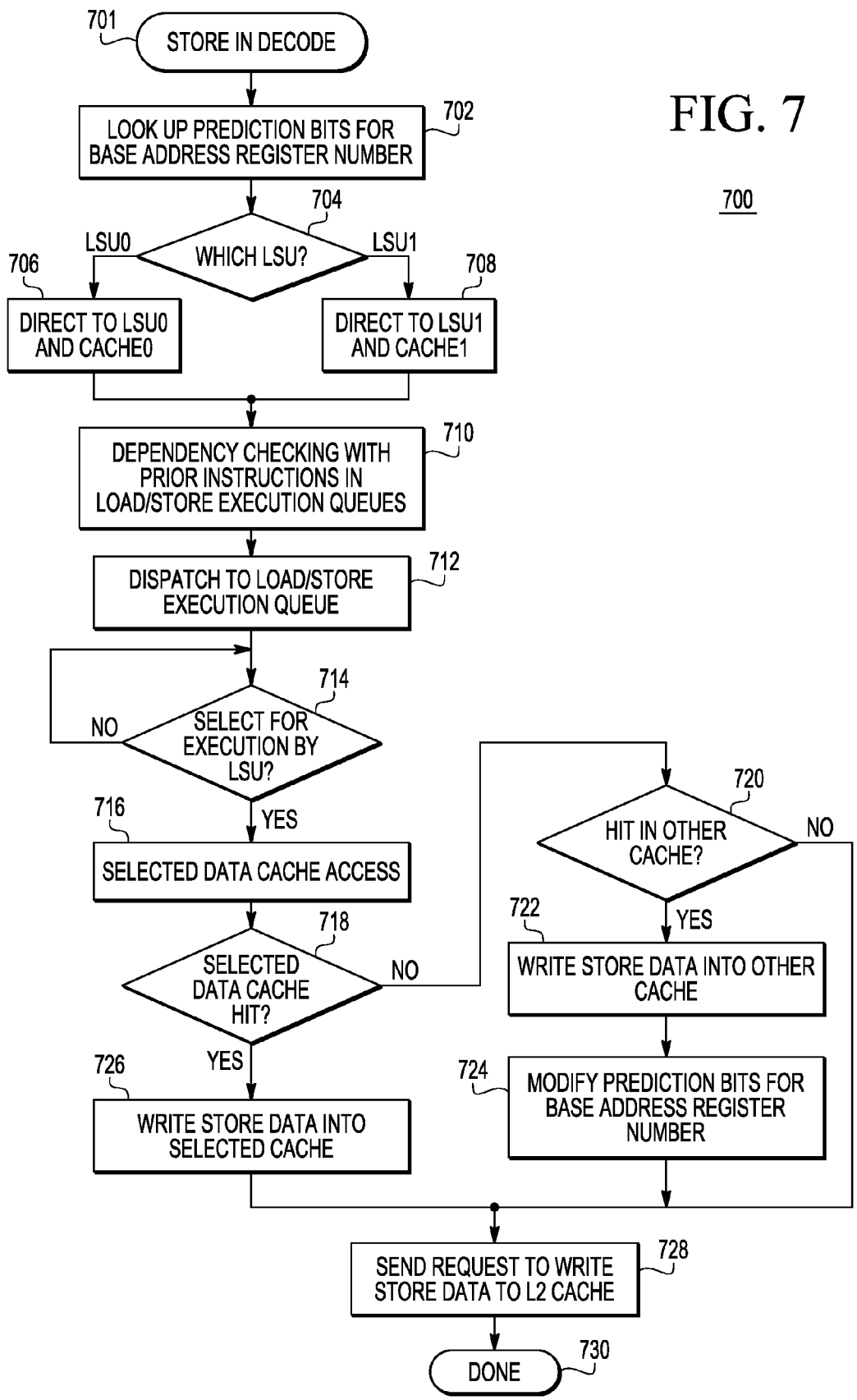
FIG. 7 illustrates, in flow diagram form, a method of steering a store instruction in which the L1 data cache 0 and the L1 data cache 1 of FIG. 3 operate in write through mode, in accordance with one embodiment of the present disclosure.

FIG. 7 illustrates, in flow diagram form, a method 700 of executing a store instruction in single thread mode in which L1 data caches 216 operate in write through mode, in accordance with one embodiment of the present disclosure. For the method of FIG. 7, a predictive steering mechanism, in which one or more prediction bits corresponding to each register of register files 208a and 208b may be stored, for example, in storage circuitry 219. Note that the descriptions provided above with respect to the predictive steering mechanism of FIG. 5 apply to FIG. 7. Method 700 begins with block 701 in which a store instruction is received in decode (e.g. by decode/issue unit 202a or 202b). Method 700 proceeds to block 702 in which the one or more prediction bits for the base address register number are looked up (e.g. obtained from storage circuitry 219). The base address register number refers to the register number of the register indicated by the load instruction as storing the base address for the load instruction.

Method 700 continues to decision diamond 704 in which it is determined to which LSU to direct the store instruction. If, based on the one or more prediction bits, the store instruction is directed to LSU0, method 700 proceeds to block 706 in which steering logic 203 of the corresponding decode/issue unit directs the store instruction to LSU0 and L1 data cache 0 (and thus the instruction will be provided to ld/st ex queues 204a). If, based on the one or more prediction bits, the store instruction is directed to LSU1, method 700 proceeds to block 708 in which steering logic 203 of the corresponding decode/issue unit directs the store instruction to LSU1 and L1 data cache 1 (and thus the instruction will be provided to ld/st ex queues 204a). Note that the description provided above for blocks 504, 506, 508, and 510 apply to blocks 702, 704, 706, and 708, respectively.

After blocks 706 and 708, the method proceeds to block 710 in which dependency checking with prior instructions in the selected group of ld/st execution queues 204 is performed. For example, if L1 data cache 0 is selected, the dependency checking is performed on prior instruction in queues 204a, and if L1 data cache 1 is selected, the dependency checking is performed on prior instructions in queues 204b. The method proceeds to block 712 in which the store instruction is dispatched to an appropriate queue of the selected group of queues (in 204a or 204b), based on the dependency checking previously performed. For example, as described above, if the current store instruction is dependent on an instruction already within a queue, it is placed in the same queue. The method then proceeds to decision diamond 714 in which the store instruction waits to be selected for execution by the selected LSU. For example, if LSU0 was selected, then the store instruction waits in one of the queues of queues 204a until selected by ld/st arbiter 206a for execution by LSU0, and if LSU1 was selected, then the store instruction waits in one of the queues of queue 204b until selected by ld/st arbiter 206b for execution by LSU1.

Once the store instruction is selected for execution, the method proceeds to block 716 in which the data cache access to the selected cache (L1 data cache 0 or L1 data cache 1) is performed. For example, if the selected cache is L1 data cache 0, the request address of the store instruction is provided to L1 data cache 0 and if the selected cache is L1 data cache 1, the request address of the store instruction is provided to L1 data cache 1. Note that the descriptions provided above with respect to FIGS. 4 and 5 as to how the circuitry of FIG. 3 may be configured so as to direct the request address to the appropriate L1 data cache also apply here. Method 700 then proceeds to decision diamond 718 in which it is determined if a hit occurred in the selected data cache. If so, method 700 proceeds to block 726 in which the store data corresponding to the store instruction is written to the cache line which resulted in the hit. The method proceeds to block 728 in which a request to write the store data corresponding to the store instruction is sent to the L2 cache. In this manner, both the selected L1 data cache and the L2 cache will be updated with the store data. Note that, since L1 data caches 216 operate in write through mode in method 700, L2 is updated whenever either L1 data cache 0 or L1 data cache 1 is updated. The method then ends at done 730.

If, at decision diamond 718, a miss occurs in the selected data cache, method 700 proceeds to decision diamond 720 in which it is determined whether the access address for the store instruction hits in the other L1 data cache. For example, if L1 data cache 0 was originally selected by decision diamond 704, then the other cache would be L1 data cache 1. Note that the descriptions provided above with respect to FIGS. 4 and 5 as to how the circuitry in FIG. 3 may be configured and operated to appropriately send the request to the other cache may also apply here. If, at decision diamond 720, a hit occurs in the other L1 data cache, the store data corresponding to the store instruction is written to the cache line which resulted in the hit. Method 700 then proceeds to block 724 in which the one or more prediction bits for the base address register number are modified. The modification described above in reference to block 530 of FIG. 5 also apply here to block 724. Method 700 then proceeds to block 728, in which the request is also sent to the L2 cache, as described above. If, at decision diamond 720, a miss occurs, method 700 continues to block 728 so that L2 may be updated with the store data.

Figure 8:
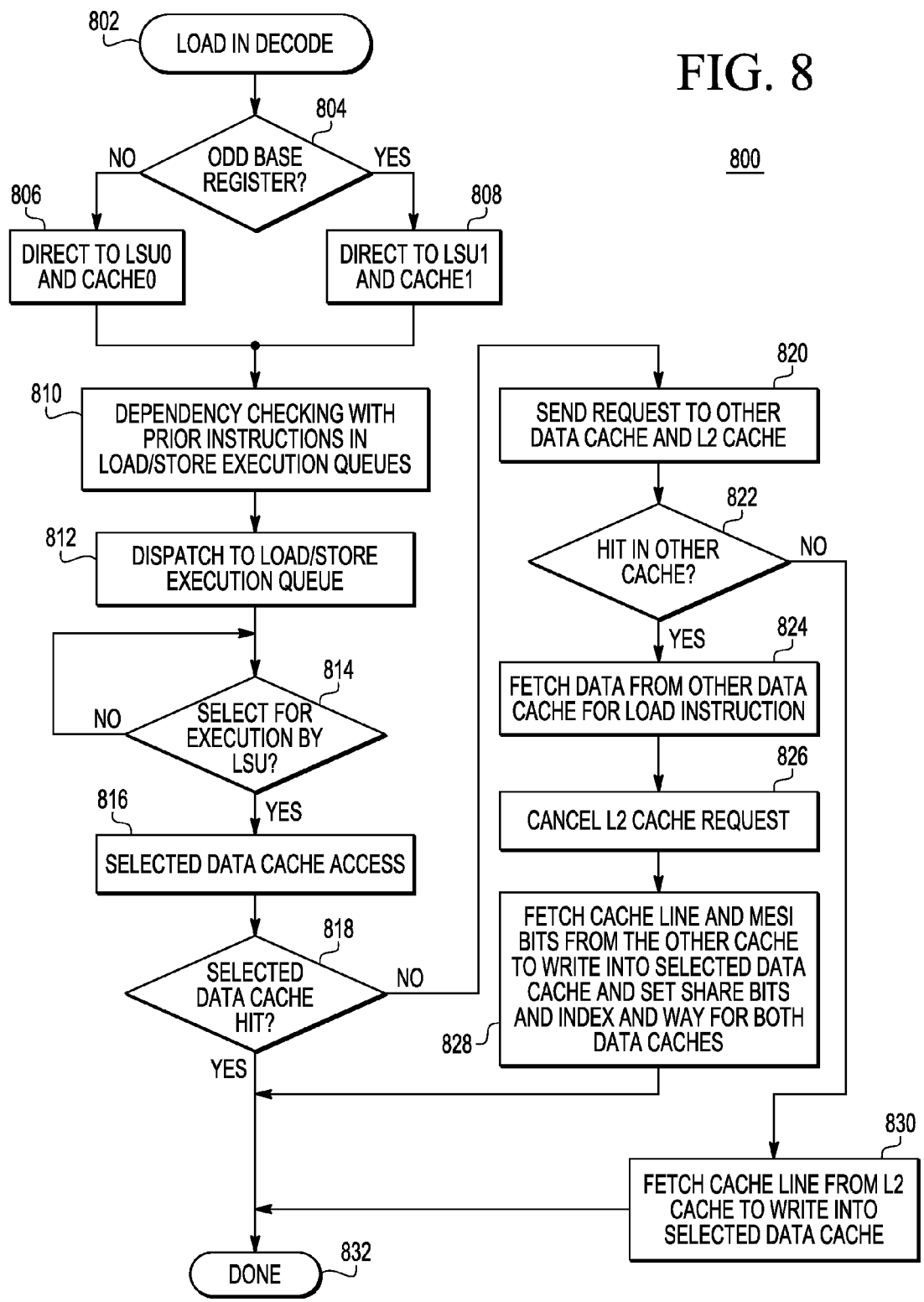
FIG. 8 illustrates, in flow diagram form, a method of steering a load instruction in which the L1 data cache 0 and the L1 data cache 1 of FIG. 3 operate in copy back mode, in accordance with one embodiment of the present disclosure.

FIG. 8 illustrates, in flow diagram form, a method 800 of executing a load instruction in single thread mode in which L1 data caches 216 operate in copy back mode, in accordance with one embodiment of the present disclosure. For the method of FIG. 8, a fixed steering mechanism, based on whether the register number of the register containing the base address of the load instruction is odd or even, is used to direct the instruction to the appropriate cache. Method 800 begins with block 802 in which a load instruction is received in decode (e.g. by decode/issue unit 202a or 202b). Method 800 continues to decision diamond 804 in which it is determined whether the register number of the base address register is odd or even. If it is even, method 800 proceeds to block 806 in which steering logic 203 of the corresponding decode/issue unit directs the load instruction to LSU0 and L1 data cache 0 (and thus the instruction will be provided to ld/st ex queues 204a). If it is odd, method 800 proceeds to block 808 in which steering logic 203 of the corresponding decode/issue unit directs the load instruction to LSU1 and L1 data cache 1 (and thus the instruction will be provided to ld/st ex queues 204a).

After blocks 806 and 808, the method proceeds to block 810 in which dependency checking with prior instructions in the selected group of ld/st execution queues 204 is performed. For example, if L1 data cache 0 is selected, the dependency checking is performed on prior instruction in queues 204a, and if L1 data cache 1 is selected, the dependency checking is performed on prior instructions in queues 204b. The method proceeds to block 812 in which the load instruction is dispatched to an appropriate queue of the selected group of queues (in 204a or 204b), based on the dependency checking previously performed. For example, as described above, if the current load instruction is dependent on an instruction already within a queue, it is placed in the same queue. The method then proceeds to decision diamond 814 in which the store instruction waits to be selected for execution by the selected LSU. For example, if LSU0 was selected, then the load instruction waits in one of the queues of queues 204a until selected by ld/st arbiter 206a for execution by LSU0, and if LSU1 was selected, then the load instruction waits in one of the queues of queue 204b until selected by ld/st arbiter 206b for execution by LSU1.

Once the load instruction is selected for execution, the method proceeds to block 816 in which the data cache access to the selected cache (L1 data cache 0 or L1 data cache 1) is performed. For example, if the selected cache is L1 data cache 0, the request address of the load instruction is provided to L1 data cache 0 and if the selected cache is L1 data cache 1, the request address of the load instruction is provided to L1 data cache 1. Note that the descriptions provided above with respect to FIGS. 4 and 5 as to how the circuitry of FIG. 3 may be configured so as to direct the request address to the appropriate L1 data cache also apply here. Method 800 then proceeds to decision diamond 818 in which it is determined if a hit occurred in the selected data cache. If so, the desired data for the load instruction has been located in the selected cache, and the selected cache can provide the data back to the selected LSU, and the method ends at done 832. However, if a miss occurred in the selected data cache, method 800 proceeds to block 820. In block 820, the access request for the load instruction is sent to the other L1 data cache as well as the L2 cache. For example, if L1 data cache 0 was originally selected by decision diamond 404, then the other cache would be L1 data cache 1.

After block 820, method 800 proceeds to decision diamond 822 in which it is determined whether the access address for the load instruction hits in the other L1 data cache. For example, if L1 data cache 0 was originally selected by decision diamond 804, then the other cache would be L1 data cache 1. Note that the descriptions provided above with respect to FIGS. 4 and 5 as to how the circuitry in FIG. 3 may be configured and operated to appropriately send the request to the other cache may also apply here. If, at decision diamond 822, the access address for the load instruction hits in the other L1 data cache, method 800 proceeds to block 824 in which the data for the load instruction is provided to the selected LSU from the other data cache. Method 800 then proceeds to block 826 in which the request to the L2 cache sent in block 820 is cancelled. Since L1 data caches 216 operate in copy back mode in method 800, the request to L2 is cancelled because the data typically will not be in the L2 cache if it exists in an L1 data cache. Method 800 then proceeds to block 828 in which the cache line and its corresponding MESI bits are fetched from the other L1 data cache and written into the selected L1 data cache. Also, the share bits for both data caches are also set (i.e. asserted), and the corresponding index and ways are stored for both data caches (in which the description provided above for the share arrays with respect to block 428 also apply to block 828). Note that in this case, the cache line will be in both the L1 data caches 216.

If, at decision diamond 822, the request address resulted in a miss in the other cache, method 800 proceeds to block 830 in which the cache line is fetched from the L2 cache to be written into the selected data cache. Note that in this case, the cache line will be in both the L2 cache and the selected L1 data cache, but not in the other L1 data cache. After blocks 828 and 830, method 800 ends at done 832.

Note that for executing a load instruction in single thread mode in which L1 data caches 216 operate in copy back mode and a predictive steering mechanism is used, operation may be the same as was described above in reference to FIG. 5.

Figure 9:
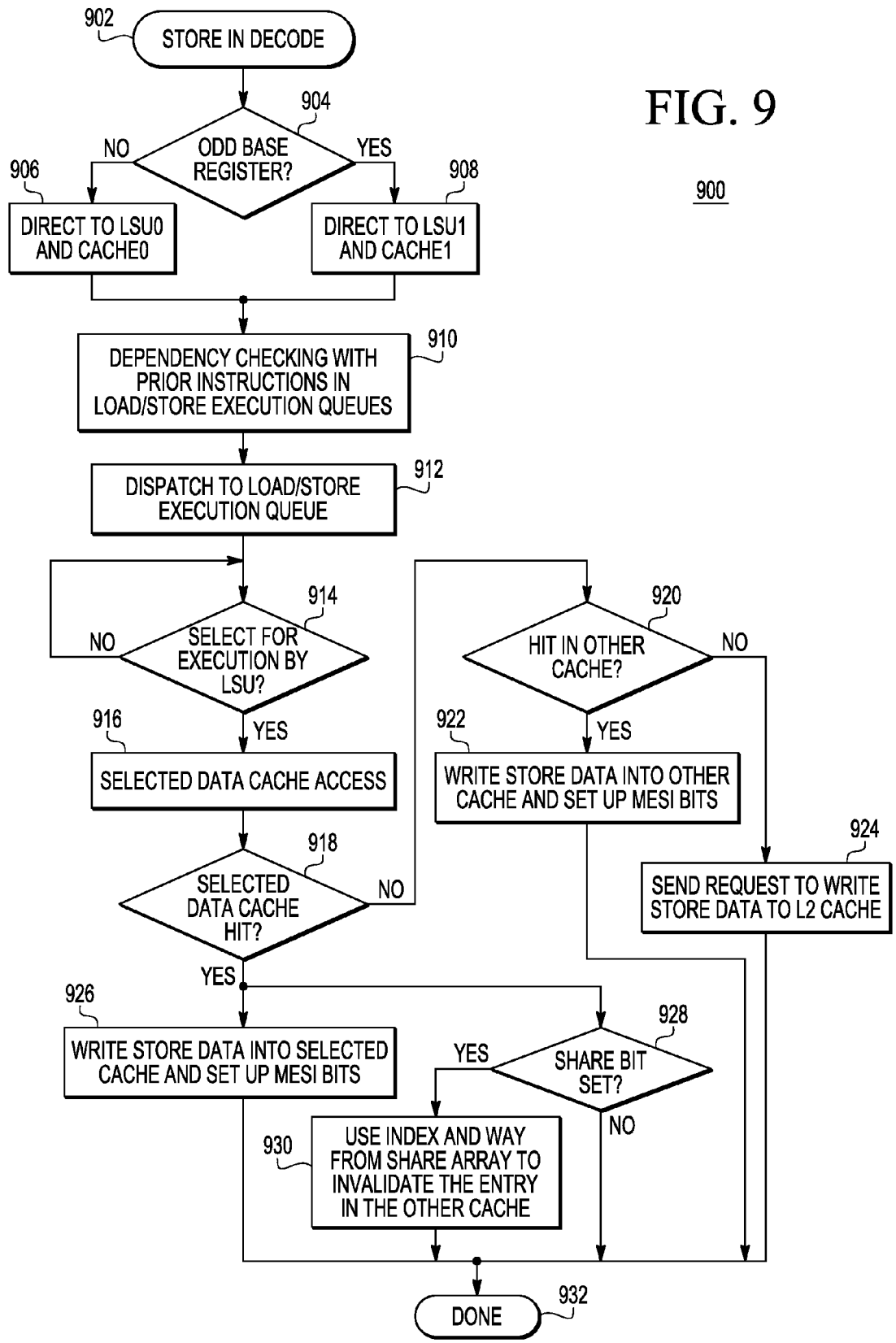
FIG. 9 illustrates, in flow diagram form, a method of steering a store instruction in which the L1 data cache 0 and the L1 data cache 1 of FIG. 3 operate in copy back mode, in accordance with one embodiment of the present disclosure.

FIG. 9 illustrates, in flow diagram form, a method 900 of executing a store instruction in single thread mode in which L1 data caches 216 operate in copy back mode, in accordance with one embodiment of the present disclosure. For the method of FIG. 9, a fixed steering mechanism, based on whether the register number of the register containing the base address of the load instruction is odd or even, is used to direct the instruction to the appropriate cache. Method 900 begins with block 902 in which a store instruction is received in decode (e.g. by decode/issue unit 202a or 202b). Method 900 continues to decision diamond 904 in which it is determined whether the register number of the base address register is odd or even. If it is even, method 900 proceeds to block 906 in which steering logic 203 of the corresponding decode/issue unit directs the load instruction to LSU0 and L1 data cache 0 (and thus the instruction will be provided to ld/st ex queues 204a). If it is odd, method 900 proceeds to block 908 in which steering logic 203 of the corresponding decode/issue unit directs the load instruction to LSU1 and L1 data cache 1 (and thus the instruction will be provided to ld/st ex queues 204a).

After blocks 906 and 908, the method proceeds to block 910 in which dependency checking with prior instructions in the selected group of ld/st execution queues 204 is performed. For example, if L1 data cache 0 is selected, the dependency checking is performed on prior instruction in queues 204a, and if L1 data cache 1 is selected, the dependency checking is performed on prior instructions in queues 204b. The method proceeds to block 912 in which the store instruction is dispatched to an appropriate queue of the selected group of queues (in 204a or 204b), based on the dependency checking previously performed. For example, as described above, if the current store instruction is dependent on an instruction already within a queue, it is placed in the same queue. The method then proceeds to decision diamond 914 in which the store instruction waits to be selected for execution by the selected LSU. For example, if LSU0 was selected, then the store instruction waits in one of the queues of queues 204a until selected by ld/st arbiter 206a for execution by LSU0, and if LSU1 was selected, then the store instruction waits in one of the queues of queue 204b until selected by ld/st arbiter 206b for execution by LSU1.

Once the store instruction is selected for execution, flow proceeds to block 916 in which the data cache access to the selected cache (L1 data cache 0 or L1 data cache 1) is performed. For example, if the selected cache is L1 data cache 0, the request address of the store instruction is provided to L1 data cache 0 and if the selected cache is L1 data cache 1, the request address of the store instruction is provided to L1 data cache 1. Note that the descriptions provided above with respect to FIGS. 4 and 5 as to how the circuitry of FIG. 3 may be configured so as to direct the request address to the appropriate L1 data cache also apply here. Method 900 then proceeds to decision diamond 918 in which it is determined if a hit occurred in the selected data cache. If so, method 900 proceeds to block 926 in which the store data corresponding to the store instruction is written to the cache line which resulted in the hit, and the MESI bits for that cache line are set up appropriately. After block 926, the method ends at done 932. From decision diamond 918, when a hit occurs in the selected data cache, the method also proceeds to decision diamond 928. At decision diamond 928, it is determined whether the share bit in the share array (of the selected cache) which corresponds to the cache line of the selected cache which resulted in the hit is set (i.e. asserted). If it is set, then the cache line is also present in the other cache, and the method proceeds to block 930 in which the index and way stored in the share entry of the share array of the selected cache is used to invalidate that cache entry in the other cache. If, at decision diamond 928, the share bit is not asserted, the method ends at done 932. (Note that the descriptions provided above for the share bits with respect to decision diamond 624 and block 622 also apply to decision diamond 928 and block 930.)

If, at decision diamond 918, a miss occurs in the selected data cache, method 900 proceeds to decision diamond 920 in which it is determined whether the access address for the store instruction hits in the other L1 data cache. For example, if L1 data cache 0 was originally selected by decision diamond 904, then the other cache would be L1 data cache 1. Note that the descriptions provided above with respect to FIGS. 4 and 5 as to how the circuitry in FIG. 3 may be configured and operated to appropriately send the request to the other cache may also apply here. If, at decision diamond 920, a hit occurs in the other L1 data cache, the store data corresponding to the store instruction is written to the cache line which resulted in the hit, and the MESI bits for that cache line are set up appropriately. Method 900 then proceeds to done 932. If, at decision diamond 920, a miss occurs, method 900 continues to block 924 in which a request to write the store data corresponding to the store instruction is sent to the L2 cache. Note that, since L1 data caches 216 operate in copy back mode in method 900, L2 is not immediately updated when either L1 data cache 0 or L1 data cache 1 is updated (such as in blocks 926 and 922).

Figure 10:
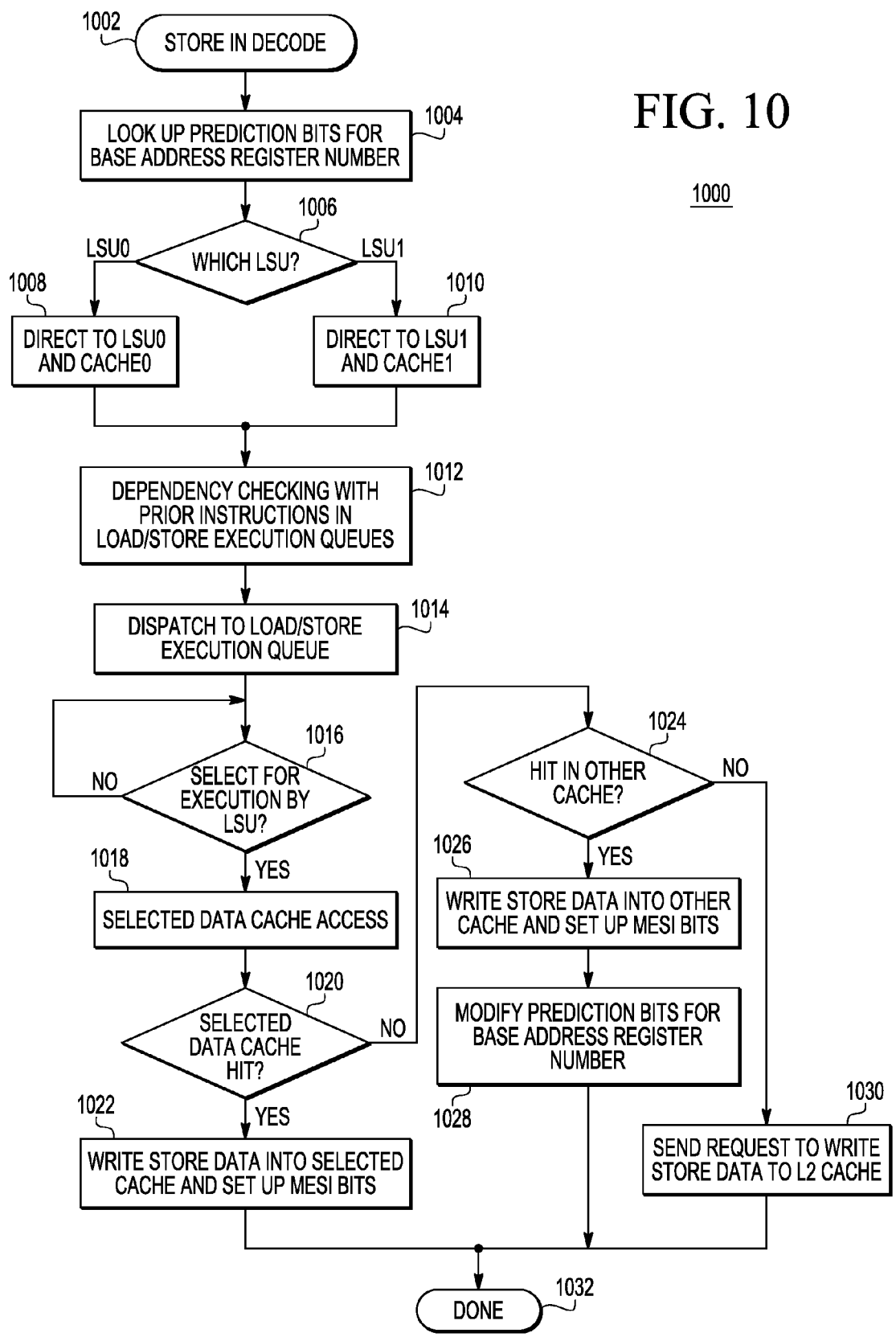
FIG. 10 illustrates, in flow diagram form, a method of steering a store instruction in which the L1 data cache 0 and the L1 data cache 1 of FIG. 3 operate in copy back mode, in accordance with one embodiment of the present disclosure.

FIG. 10 illustrates, in flow diagram form, a method 1000 of executing a store instruction in single thread mode in which L1 data caches 216 operate in copy back mode, in accordance with one embodiment of the present disclosure. For the method of FIG. 10, a predictive steering mechanism, in which one or more prediction bits corresponding to each register of register files 208a and 208b may be stored, for example, in storage circuitry 219. Note that the descriptions provided above with respect to the predictive steering mechanism of FIG. 5 apply to FIG. 10. Method 1000 begins with block 1002 in which a store instruction is received in decode (e.g. by decode/issue unit 202a or 202b). Method 1000 proceeds to block 1004 in which the one or more prediction bits for the base address register number are looked up (e.g. obtained from storage circuitry 219). The base address register number refers to the register number of the register indicated by the load instruction as storing the base address for the load instruction.

Method 1000 continues to decision diamond 1006 in which it is determined to which LSU to direct the store instruction. If, based on the one or more prediction bits, the store instruction is directed to LSU0, method 1000 proceeds to block 1008 in which steering logic 203 of the corresponding decode/issue unit directs the store instruction to LSU0 and L1 data cache 0 (and thus the instruction will be provided to ld/st ex queues 204a). If, based on the one or more prediction bits, the store instruction is directed to LSU1, method 1000 proceeds to block 1010 in which steering logic 203 of the corresponding decode/issue unit directs the store instruction to LSU1 and L1 data cache 1 (and thus the instruction will be provided to ld/st ex queues 204a). Note that the description provided above for blocks 504, 506, 508, and 510 apply to blocks 1004, 1006, 1008, and 1010, respectively.

After blocks 1008 and 1010, the method proceeds to block 1012 in which dependency checking with prior instructions in the selected group of ld/st execution queues 204 is performed. For example, if L1 data cache 0 is selected, the dependency checking is performed on prior instruction in queues 204a, and if L1 data cache 1 is selected, the dependency checking is performed on prior instructions in queues 204b. The method proceeds to block 1014 in which the store instruction is dispatched to an appropriate queue of the selected group of queues (in 204a or 204b), based on the dependency checking previously performed. For example, as described above, if the current store instruction is dependent on an instruction already within a queue, it is placed in the same queue. The method then proceeds to decision diamond 1016 in which the store instruction waits to be selected for execution by the selected LSU. For example, if LSU0 was selected, then the store instruction waits in one of the queues of queues 204a until selected by ld/st arbiter 206a for execution by LSU0, and if LSU1 was selected, then the store instruction waits in one of the queues of queue 204b until selected by ld/st arbiter 206b for execution by LSU1.

Once the store instruction is selected for execution, the method proceeds to block 1018 in which the data cache access to the selected cache (L1 data cache 0 or L1 data cache 1) is performed. For example, if the selected cache is L1 data cache 0, the request address of the store instruction is provided to L1 data cache 0 and if the selected cache is L1 data cache 1, the request address of the store instruction is provided to L1 data cache 1. Note that the descriptions provided above with respect to FIGS. 4 and 5 as to how the circuitry of FIG. 3 may be configured so as to direct the request address to the appropriate L1 data cache also apply here. Method 1000 then proceeds to decision diamond 1020 in which it is determined if a hit occurred in the selected data cache. If so, method 1000 proceeds to block 1022 in which the store data corresponding to the store instruction is written to the cache line which resulted in the hit, and the MESI bits corresponding to that cache line are set up appropriately. The method then ends at done 1032.

If, at decision diamond 1020, a miss occurs in the selected data cache, method 1000 proceeds to decision diamond 1024 in which it is determined whether the access address for the store instruction hits in the other L1 data cache. For example, if L1 data cache 0 was originally selected by decision diamond 1006, then the other cache would be L1 data cache 1. Note that the descriptions provided above with respect to FIGS. 4 and 5 as to how the circuitry in FIG. 3 may be configured and operated to appropriately send the request to the other cache may also apply here. If, at decision diamond 1024, a hit occurs in the other L1 data cache, the store data corresponding to the store instruction is written to the cache line which resulted in the hit, and the MESI bits corresponding to that cache line are set up appropriately. Method 1000 then proceeds to block 1028 in which the one or more prediction bits for the base address register number are modified. The modification described above in reference to block 530 of FIG. 5 also apply here to block 1028. Method 1000 then ends at done 1032. If, at decision diamond 1024, a miss occurs, method 1000 continues to block 1030 in which a request to write the store data corresponding to the store instruction is sent to the L2 cache. The method then ends at done 1032. Note that, since L1 data caches 216 operate in copy back mode in method 700, the L2 cache is not immediately updated when either L1 data cache 0 or L1 data cache 1 is updated (such as in blocks 102 and 1026).

Therefore, by now it should be appreciated how multiple L1 data caches independently used in separate threads during a multi-thread mode can be reconfigured such that multiple L1 data caches can continue to operate independently during a single thread mode. Furthermore, a steering mechanism (either fixed or predictive) may be used to determine how load and store instructions of the single thread are appropriately directed to each of the multiple L1 data caches when operating in single thread mode. In this manner, performance of the data processing system may be improved in single thread mode as compared to other systems, such as those which use only one L1 data cache during single thread mode.

Note that the functions of the various units and circuitries described above, such as, for example, the decode/issue units 202, the ld/st ex queues 204, ld/st arbiters 206, ld/st ex units 210, and L1 data caches 216 may be performed by various different types of logic or logic instructions. For example, any of the methods (or portions thereof) described above with respect to the flow diagrams of FIGS. 4-10 can be performed by logic or logic instructions located within processor 102.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a method which includes, in a computer system including a first load/store execution unit, a first Level 1 (L1) data cache unit coupled to the first load/store execution unit, a second load/store execution unit, and a second L1 data cache unit coupled to the second load/store execution unit, directing some instructions to the first load/store execution unit and other instructions to the second load/store execution unit when executing a single thread of instructions. Item 2 includes the method of item 1 and further includes alternately directing the load and store instructions to the first load store execution unit and to the second load/store execution unit; and setting up base register prediction based on selection of the first load store execution unit or the second load store execution unit. Item 3 includes the method of item 1 and further includes an array of share indicators corresponding to the first L1 data cache unit that indicate whether a cache line is shared with another cache; and an array of location indicators that point to the shared cache line in the other cache. Item 4 includes the method of item 1 and further includes checking dependency between a current load or store instruction with instructions in load execution queues; dispatching the current load or store instruction to a selected load execution queue; if the current load or store instruction is selected for execution, accessing a selected one of the first and second L1 data cache units; and determining if there is a cache hit in the selected one of the first and second L1 data cache units. Item 5 includes the method of item 4 and further includes, when the current load or store instruction is a load instruction and there is no cache hit, sending a request for cache data to the one of the first and second L1 data cache units that was not selected, determining if there is a cache hit in the one of the first and second L1 data cache units that was not selected, when there is not a cache hit in the one of the first and second L1 data cache units that was not selected, fetching a cache line from Level 2 (L2) data cache to write into the selected one of the first and second L1 data cache units, and when there is a cache hit in the one of the first and second L1 data cache units that was not selected, fetching data from the one of the first and second L1 data cache units that was not selected, when the first and second L1 data cache units are in write-through mode, setting a share indicator and location indicator of the one of the first and second L1 data cache units that was not selected for the one of the first and second L1 data cache units that was selected, when the first and second L1 data cache units are in copy-back mode, canceling the request for cache data to the L2 data cache unit, setting the share indicator and the location indicator of the one of the first and second L1 data cache units that was not selected for the one of the first and second L1 data cache units that was selected, and fetching a cache line and control indicators from the one of the first and second L1 data cache units that was not selected to write into the one of the first and second L1 data cache units that was selected. Item 6 includes the method of item 4 and further includes when the current load or store instruction is a store instruction and there is no cache hit, determining if there is a cache hit in the one of the first and second L1 data cache units that was not selected, when there is not a cache hit in the one of the first and second L1 data cache units that was not selected, sending a request to write store data to L2 data cache, when there is a cache hit in the one of the first and second L1 data cache units that was not selected, writing the store data in the one of the first and second L1 data cache units that was not selected, when the one of the first and second L1 data cache units that was not selected is in copy-back mode, initializing cache control indicators; and when there is a cache hit in the one of the first and second L1 data cache units that was selected, writing the store data in the one of the first and second L1 data cache units that was selected, at the same time that the store data is being written, invalidating an entry of the one of the first and second L1 data cache units if the share indicator is set, when the one of the first and second L1 data cache units that was selected is in copy-back mode, initializing cache control indicators, and when the one of the first and second L1 data cache units that was selected is in write-through mode, sending a request to write store data to L2 data cache. Item 7 includes the method of item 1, and further includes looking up prediction indicators for a base address register number for one of the load or store instructions; directing the load or store instruction to a selected one of the first load store execution unit and a second load/store execution unit; checking dependency between a current load or store instruction with instructions in load execution queues; dispatching the current load or store instruction to a selected load execution queue; if the current load or store instruction is selected for execution, accessing a selected one of the first and second L1 data cache units; determining if there is a cache hit in the selected one of the first and second L1 data cache units; when the current load or store instruction is a load instruction and there is no cache hit, sending a request for cache data to the one of the first and second L1 data cache units that was not selected and to L2 cache, determining if there is a cache hit in the one of the first and second L1 data cache units that was not selected, when there is not a cache hit in the one of the first and second L1 data cache units that was not selected, fetching a cache line from L2 data cache to write into the selected one of the first and second L1 data cache units, and when there is a cache hit in the one of the first and second L1 data cache units that was not selected, fetching data from the one of the first and second L1 data cache units that was not selected, canceling the request to the L2 cache, and modifying prediction indicators for a base address register number. Item 8 includes the method of item 7 and further includes when the current load or store instruction is a store instruction and there is no cache hit, determining if there is a cache hit in the one of the first and second L1 data cache units that was not selected, when there is not a cache hit in the one of the first and second L1 data cache units that was not selected, sending a request to write store data to L2 data cache, when there is a cache hit in the one of the first and second L1 data cache units that was not selected, writing the store data in the one of the first and second L1 data cache units that was not selected, and modifying prediction indicators for a base address register number; when the one of the first and second L1 data cache units that was not selected is in copy-back mode, initializing cache control indicators, and when the one of the first and second L1 data cache units that was not selected is in write-through mode, sending a request to write store data to L2 data cache. Item 9 includes the method of item 7 and further includes when there is a cache hit in the one of the first and second L1 data cache units that was selected, writing the store data in the one of the first and second L1 data cache units that was selected, when the one of the first and second L1 data cache units that was selected is in copy-back mode, initializing cache control indicators, and when the one of the first and second L1 data cache units that was selected is in write-through mode, sending a request to write store data to L2 data cache.

Item 10 includes a microprocessor system including a first load/store execution unit; a first L1 data cache unit coupled to the first load/store execution unit; a second load/store execution unit; a second L1 data cache unit coupled to the second load/store execution unit, wherein the first load/store execution unit and the first L1 data cache operate independently of the second load/store execution unit and the second L1 data cache unit; and a plurality of decode/issue units configured to specify the first load/store execution unit and the second load/store execution unit when executing a single thread of instructions based on steering logic that directs load and store instructions for the single thread to the first load/store execution unit or the second load/store execution unit. Item 11 includes the system of item 10 and further includes an array of share indicators corresponding to the first L1 data cache unit that indicate whether a cache line is shared with another cache; and an array of location indicators that point to the shared cache line in the other cache. Item 12 includes the system of item 10, wherein the steering logic alternately directing the load and store instructions to the first load store execution unit and to the second load/store execution unit; and setting up base register prediction based on selection of the first load store execution unit or the second load store execution unit. Item 13 includes the system of item 11 and further includes logic instructions configured to check dependency between a current load or store instruction with instructions in load execution queues; dispatch the current load or store instruction to a selected load execution queue; if the current load or store instruction is selected for execution, access a selected one of the first and second L1 data cache units; and determine if there is a cache hit in the selected one of the first and second L1 data cache units. Item 14 includes the system of item 13 and further includes logic instructions configured to when the current load or store instruction is a load instruction and there is no cache hit, send a request for cache data to the one of the first and second L1 data cache units that was not selected, determine if there is a cache hit in the one of the first and second L1 data cache units that was not selected, when there is not a cache hit in the one of the first and second L1 data cache units that was not selected, fetch a cache line from L2 data cache to write into the selected one of the first and second L1 data cache units, and when there is a cache hit in the one of the first and second L1 data cache units that was not selected, fetch data from the one of the first and second L1 data cache units that was not selected; and when there is a cache hit in the one of the first and second L1 data cache units that was not selected, when the first and second L1 data cache units are in write-through mode, set a share indicator and a location indicator of the one of the first and second L1 data cache units that was not selected for the one of the first and second L1 data cache units that was selected, when the first and second L1 data cache units are in copy-back mode, cancel the request for cache data to the L2 data cache units, set a share indicator and a location indicator of the one of the first and second L1 data cache units that was not selected for the one of the first and second L1 data cache units that was selected, and fetch a cache line and control indicators from the one of the first and second L1 data cache units that was not selected to write into the one of the first and second L1 data cache units that was selected. Item 15 includes the system of item 13 and further includes logic instructions configured to when the current load or store instruction is a store instruction and there is no cache hit, determine if there is a cache hit in the one of the first and second L1 data cache units that was not selected, when there is not a cache hit in the one of the first and second L1 data cache units that was not selected, send a request to write store data to L2 data cache, when there is a cache hit in the one of the first and second L1 data cache units that was not selected, write the store data in the one of the first and second L1 data cache units that was not selected, and when the one of the first and second L1 data cache units that was not selected is in copy-back mode, initialize cache control indicators; and when there is a cache hit in the one of the first and second L1 data cache units that was selected, write the store data in the one of the first and second L1 data cache units that was selected, at the same time that the store data is being written, invalidate an entry of the one of the first and second L1 data cache units if the share indicator is set, when the one of the first and second L1 data cache units that was selected is in copy-back mode, initialize cache control indicators, and when the one of the first and second L1 data cache units that was selected is in write-through mode, send a request to write store data to L2 data cache. Item 16 includes the system of item 10 and further includes logic instructions configured to look up prediction indicators for a base address register number for one of the load or store instructions; direct the load or store instruction to a selected one of the first load store execution unit and a second load/store execution unit; check dependency between a current load or store instruction with instructions in load execution queues, dispatch the current load or store instruction to a selected load execution queue; if the current load or store instruction is selected for execution, access a selected one of the first and second L1 data cache units; and determine if there is a cache hit in the selected one of the first and second L1 data cache units. Item 17 includes the system of item 16 and further includes logic instructions configured to when the current load or store instruction is a load instruction and there is no cache hit, send a request for cache data to the one of the first and second L1 data cache units that was not selected and to L2 cache, determine if there is a cache hit in the one of the first and second L1 data cache units that was not selected, when there is not a cache hit in the one of the first and second L1 data cache units that was not selected, fetch a cache line from L2 data cache to write into the selected one of the first and second L1 data cache units, and when there is a cache hit in the one of the first and second L1 data cache units that was not selected, fetch data from the one of the first and second L1 data cache units that was not selected, cancel the request to the L2 cache, and modify prediction indicators for a base address register number. Item 18 includes the system of item 16 and further includes logic instructions configured to when the current load or store instruction is a store instruction and there is no cache hit, determine if there is a cache hit in the one of the first and second L1 data cache units that was not selected, when there is not a cache hit in the one of the first and second L1 data cache units that was not selected, send a request to write store data to L2 data cache, when there is a cache hit in the one of the first and second L1 data cache units that was not selected, write the store data in the one of the first and second L1 data cache units that was not selected, and modify prediction indicators for a base address register number, when the one of the first and second L1 data cache units that was not selected is in copy-back mode, initialize cache control indicators, and when the one of the first and second L1 data cache units that was not selected is in write-through mode, send a request to write store data to L2 data cache. Item 19 includes the system of item 16 and further includes logic instructions configured to when there is a cache hit in the one of the first and second L1 data cache units that was selected, write the store data in the one of the first and second L1 data cache units that was selected, when the one of the first and second L1 data cache units that was selected is in copy-back mode, initialize cache control indicators, and when the one of the first and second L1 data cache units that was selected is in write-through mode, send a request to write store data to L2 data cache.

Item 20 includes a method which includes, in a computer system including a first L1 data cache unit, and a second L1 data cache unit that operates independently of the first Level 1 L1 data cache unit, maintaining a share array including a plurality of share indicators when executing a single thread of instructions, wherein the share indicators are set based on whether requested data is found in the first L1 data cache or the second L1 data cache; selecting the first L1 data cache unit for some of the instructions and selecting the second L1 data cache unit for other of the instructions, based on the share indicators.

What is claimed is:
1. A method comprising:
in a computer system including a first load/store execution unit, a first Level 1 (L1) data cache unit coupled to the first load/store execution unit, a second load/store execution unit, and a second L1 data cache unit coupled to the second load/store execution unit, the method comprises:
directing some instructions to the first load/store execution unit and other instructions to the second load/store execution unit when executing a single thread of instructions, wherein each directed instruction is directed to one of the first or the second load/store execution units based on a characteristic of a register number which holds a base address of the load/store instruction or based on one or more prediction bits associated with the register number which holds the base address of the load/store instruction, wherein the one or more prediction bits indicate one of the first or second load/store execution units;

dispatching a current load or store instruction to a selected load execution queue;

if the current load or store instruction is selected for execution, accessing a selected one of the first and second L1 data cache units;

determining if there is a cache hit in the selected one of the first and second L1 data cache units; and when there is no cache hit in the selected one of the first and selected L1 data cache units, determining if there is a cache hit in the one of the first and second L1 data cache units that was not selected.

2. The method of claim 1 further comprising:
alternately directing the load and store instructions to the first load store execution unit and to the second load/store execution unit; and
setting up base register prediction based on selection of the first load store execution unit or the second load store execution unit.

3. The method of claim 1 further comprising:
an array of share indicators corresponding to the first L1 data cache unit that indicate whether a cache line is shared with another cache; and
an array of location indicators that point to the shared cache line in the other cache.

4. The method of claim 3 further comprising:
prior to dispatching the current load or store instruction to the selected load execution queue, checking dependency between a current load or store instruction with instructions in load execution queues.

5. The method of claim 4 further comprising:
when the current load or store instruction is a load instruction and there is no cache hit in the selected one of the first and second L1 data cache units,
when there is not a cache hit in the one of the first and second L1 data cache units that was not selected,
fetching a cache line from Level 2 (L2) data cache to write into the selected one of the first and second L1 data cache units, and
when there is a cache hit in the one of the first and second L1 data cache units that was not selected,
fetching data from the one of the first and second L1 data cache units that was not selected,
when the first and second L1 data cache units are in write-through mode,
setting a share indicator and location indicator of the one of the first and second L1 data cache units that was not selected for the one of the first and second L1 data cache units that was selected,
when the first and second L1 data cache units are in copy-back mode,
canceling the request for cache data to the L2 data cache unit,
setting the share indicator and the location indicator of the one of the first and second L1 data cache units that was not selected for the one of the first and second L1 data cache units that was selected, and fetching a cache line and control indicators from the one of the first and second L1 data cache units that was not selected to write into the one of the first and second L1 data cache units that was selected.

6. The method of claim 4 further comprising:
when the current load or store instruction is a store instruction and there is no cache hit in the selected one of the first and second L1 data cache units,
when there is not a cache hit in the one of the first and second L1 data cache units that was not selected,
sending a request to write store data to L2 data cache,
when there is a cache hit in the one of the first and second L1 data cache units that was not selected,
writing the store data in the one of the first and second L1 data cache units that was not selected,
when the one of the first and second L1 data cache units that was not selected is in copy-back mode, initializing cache control indicators; and
when there is a cache hit in the one of the first and second L1 data cache units that was selected,
writing the store data in the one of the first and second L1 data cache units that was selected,
at the same time that the store data is being written, invalidating an entry of the one of the first and second L1 data cache units if the share indicator is set,
when the one of the first and second L1 data cache units that was selected is in copy-back mode, initializing cache control indicators, and
when the one of the first and second L1 data cache units that was selected is in write-through mode, sending a request to write store data to L2 data cache.

7. The method of claim 1 further comprising:
prior to dispatching the current load or store instruction to the selected execution queue, looking up prediction indicators for a base address register number for one of the load or store instructions, directing the load or store instruction to a selected one of the first load store execution unit and a second load/store execution unit, and checking dependency between a current load or store instruction with instructions in load execution queues;
when the current load or store instruction is a load instruction and there is no cache hit in the selected one of the first and second L1 data cache units,
when there is not a cache hit in the one of the first and second L1 data cache units that was not selected,
fetching a cache line from L2 data cache to write into the selected one of the first and second L1 data cache units, and
when there is a cache hit in the one of the first and second L1 data cache units that was not selected,
fetching data from the one of the first and second L1 data cache units that was not selected,
canceling the request to the L2 cache, and
modifying prediction indicators for a base address register number.

8. The method of claim 7 further comprising:
when the current load or store instruction is a store instruction and there is no cache hit in the selected one of the first and second L1 data cache units,
when there is not a cache hit in the one of the first and second L1 data cache units that was not selected,
sending a request to write store data to L2 data cache,
when there is a cache hit in the one of the first and second L1 data cache units that was not selected,
writing the store data in the one of the first and second L1 data cache units that was not selected, and modifying prediction indicators for a base address register number,
when the one of the first and second L1 data cache units that was not selected is in copy-back mode, initializing cache control indicators, and
when the one of the first and second L1 data cache units that was not selected is in write-through mode, sending a request to write store data to Level 2 L2 data cache.

9. The method of claim 7 further comprising:
when there is a cache hit in the one of the first and second L1 data cache units that was selected,
writing the store data in the one of the first and second L1 data cache units that was selected,
when the one of the first and second L1 data cache units that was selected is in copy-back mode, initializing cache control indicators, and
when the one of the first and second L1 data cache units that was selected is in write-through mode, sending a request to write store data to L2 data cache.

10. A microprocessor system comprising:
a first load/store execution unit;
a first L1 data cache unit coupled to the first load/store execution unit;
a second load/store execution unit;
a second L1 data cache unit coupled to the second load/store execution unit, wherein the first load/store execution unit and the first L1 data cache operate independently of the second load/store execution unit and the second L1 data cache unit; and
a plurality of decode/issue units configured to specify the first load/store execution unit and the second load/store execution unit when executing a single thread of instructions based on steering logic that directs load and store instructions for the single thread to the first load/store execution unit or the second load/store execution unit, wherein each load and store instruction for the single thread is directed by the steering logic to one of the first or the second load/store execution units based on a characteristic of a register number which holds a base address of the load/store instruction or based on one or more prediction bits associated with the register number which holds the base address of the load/store instruction, wherein the one or more prediction bits indicate one of the first or second load/store execution units, wherein the plurality of decode/issue units are further configured to dispatch a current load or store instruction to a selected load execution queue;
a load/store arbiter configured to select the current load or store instruction for execution, wherein a selected one of the first and second L1 data cache units is configured to determine if there is a cache hit for the current load or store instruction, and the one of the first and second L1 data cache units that was not selected is configured to,
when there is no cache hit in the selected one of the first and second L1 data cache units, determine if there is a cache hit for the current load or store instruction.

11. The system of claim 10 further comprising:
an array of share indicators corresponding to the first L1 data cache unit that indicate whether a cache line is shared with another cache; and
an array of location indicators that point to the shared cache line in the other cache.

12. The system of claim 11
wherein the plurality of decode/issue units are configured to check dependency between a current load or store instruction with instructions in load execution queues prior to dispatching the current load or store instruction to the selected load execution queue.

13. The system of claim 12
wherein the L1 data cache units are configured to
when the current load or store instruction is a load instruction and there is no cache hit in the selected one of the first and second L1 data cache units,
when there is not a cache hit in the one of the first and second L1 data cache units that was not selected, fetch a cache line from L2 data cache to write into the selected one of the first and second L1 data cache units, and
when there is a cache hit in the one of the first and second L1 data cache units that was not selected, fetch data from the one of the first and second L1 data cache units that was not selected; and
when there is a cache hit in the one of the first and second L1 data cache units that was not selected,
when the first and second L1 data cache units are in write-through mode,
set a share indicator and a location indicator of the one of the first and second L1 data cache units that was not selected for the one of the first and second L1 data cache units that was selected,
when the first and second L1 data cache units are in copy-back mode,
cancel the request for cache data to the L2 data cache units,
set a share indicator and a location indicator of the one of the first and second L1 data cache units that was not selected for the one of the first and second L1 data cache units that was selected, and
fetch a cache line and control indicators from the one of the first and second L1 data cache units that was not selected to write into the one of the first and second L1 data cache units that was selected.

14. The system of claim 12
wherein the L1 data cache units are configured to
when the current load or store instruction is a store instruction and there is no cache hit in the selected one of the first and second L1 data cache units,
when there is not a cache hit in the one of the first and second L1 data cache units that was not selected, send a request to write store data to L2 data cache,
when there is a cache hit in the one of the first and second L1 data cache units that was not selected, write the store data in the one of the first and second L1 data cache units that was not selected, and
when the one of the first and second L1 data cache units that was not selected is in copy-back mode, initialize cache control indicators; and
when there is a cache hit in the one of the first and second L1 data cache units that was selected,
write the store data in the one of the first and second L1 data cache units that was selected,
at the same time that the store data is being written, invalidate an entry of the one of the first and second L1 data cache units if the share indicator is set,
when the one of the first and second L1 data cache units that was selected is in copy-back mode, initialize cache control indicators, and
when the one of the first and second L1 data cache units that was selected is in write-through mode, send a request to write store data to L2 data cache.

15. The system of claim 10 wherein the steering logic
alternately directing the load and store instructions to the first load store execution unit and to the second load/store execution unit; and
setting up base register prediction based on selection of the first load store execution unit or the second load store execution unit.

16. The system of claim 10
wherein the plurality of decode/issue units are configured to, prior to dispatching the current load or store instruction to the selected load execution queue, look up prediction indicators for a base address register number for one of the load or store instructions, direct the load or store instruction to a selected one of the first load store execution unit and a second load/store execution unit, and check dependency between a current load or store instruction with instructions in load execution queues.

17. The system of claim 16
wherein the L1 data cache units are configured to
when the current load or store instruction is a load instruction and there is no cache hit in the selected one of the first and second L1 data cache units,
when there is not a cache hit in the one of the first and second L1 data cache units that was not selected,
fetch a cache line from L2 data cache to write into the selected one of the first and second L1 data cache units, and
when there is a cache hit in the one of the first and second L1 data cache units that was not selected,
fetch data from the one of the first and second L1 data cache units that was not selected,
cancel the request to the L2 cache, and
modify prediction indicators for a base address register number.

18. The system of claim 16
wherein the L1 data cache units are configured to
when the current load or store instruction is a store instruction and there is no cache hit in the selected one of the first and second L1 data cache units,
when there is not a cache hit in the one of the first and second L1 data cache units that was not selected,
send a request to write store data to L2 data cache,
when there is a cache hit in the one of the first and second L1 data cache units that was not selected,
write the store data in the one of the first and second L1 data cache units that was not selected, and
modify prediction indicators for a base address register number,
when the one of the first and second L1 data cache units that was not selected is in copy-back mode, initialize cache control indicators, and
when the one of the first and second L1 data cache units that was not selected is in write-through mode, send a request to write store data to L2 data cache.

19. The system of claim 16
wherein the L1 data cache units are configured to
when there is a cache hit in the one of the first and second L1 data cache units that was selected,
write the store data in the one of the first and second L1 data cache units that was selected,
when the one of the first and second L1 data cache units that was selected is in copy-back mode, initialize cache control indicators, and
when the one of the first and second L1 data cache units that was selected is in write-through mode, send a request to write store data to L2 data cache.

20. A method comprising:
in a computer system including a first load/store execution unit, a first Level 1 (L1) data cache unit coupled to the first load/store execution unit, a second load/store execution unit, and a second L1 data cache unit coupled to the second load/store execution unit,
directing some load/store instructions to the first load/store execution unit and other load/store instructions to the second load/store execution unit when executing a single thread of instructions, wherein each load/store instruction is directed to one of the first or the second load/store execution units based on a characteristic of a register number which holds a base address of the load/store instruction.

* * * * *